US011365849B2

(12) United States Patent
Dahl et al.

(10) Patent No.: US 11,365,849 B2
(45) Date of Patent: Jun. 21, 2022

(54) VALVE ASSEMBLY

(71) Applicant: MICRO MATIC A/S, Odense SV (DK)

(72) Inventors: Benny Dahl, Odense SV (DK); Morten Helvig Larsen, Odense SV (DK); Michael Jørgensen, Odense SV (DK)

(73) Assignee: MICRO MATIC A/S, Odense SV (DK)

( * ) Notice: Subject to any disclaimer, the term of this patent is extended or adjusted under 35 U.S.C. 154(b) by 0 days.

(21) Appl. No.: 16/766,486

(22) PCT Filed: Dec. 6, 2018

(86) PCT No.: PCT/EP2018/083749
§ 371 (c)(1),
(2) Date: May 22, 2020

(87) PCT Pub. No.: WO2019/110714
PCT Pub. Date: Jun. 13, 2019

(65) Prior Publication Data
US 2020/0378559 A1    Dec. 3, 2020

(30) Foreign Application Priority Data

Dec. 6, 2017 (EP) .................................. 17205649
Nov. 12, 2018 (EP) .................................. 18205644

(51) Int. Cl.
*F17C 13/04* (2006.01)
*F16K 1/30* (2006.01)

(52) U.S. Cl.
CPC .............. *F17C 13/04* (2013.01); *F16K 1/305* (2013.01); *F17C 2201/0109* (2013.01);
(Continued)

(58) Field of Classification Search
CPC .............. F17C 13/04; F17C 2205/0332; F17C 2205/0338; F16K 1/305
See application file for complete search history.

(56) References Cited

U.S. PATENT DOCUMENTS

| 5,007,614 | A | 4/1991 | Lockwood, Jr. |
| 9,360,162 | B2 * | 6/2016 | Larsen ................... B67D 1/008 |
| 2015/0205306 | A1 | 7/2015 | Schmitz et al. |

FOREIGN PATENT DOCUMENTS

| CN | 104603709 A | 5/2015 |
| EP | 0 054 717 A1 | 6/1982 |

(Continued)

OTHER PUBLICATIONS

Extended European Search Report for EP Application No. 17205649.1 dated Jan. 29, 2018, 9 pages.
(Continued)

*Primary Examiner* — Paul J Gray
(74) *Attorney, Agent, or Firm* — Nixon & Vanderhye P.C.

(57) ABSTRACT

The present invention relates to a valve assembly configured to be arranged in a cylinder opening of a gas cylinder, comprising a valve housing having a first housing end and a second housing end, a first housing opening arranged at the first housing end and a second housing opening arranged at the second housing end, the first housing opening having an inner diameter, and a bore extending between the first housing opening and the second housing opening, the bore having an inner face, and an inner valve unit arranged in the bore, said inner valve unit having an inner valve housing, and a first end and a second end, the first end having an outer diameter, the outer diameter being larger than the inner diameter of the first housing opening, the first end being configured to abut the inner face at the first opening, whereby a filling valve is provided, the inner face of the first opening being a filling valve seat, the second end comprising an inlet to the inner valve unit, the inner valve unit further comprising a consumption valve arranged at the first end, and a first pressure reduction valve configured to reduce a pressure in the gas cylinder from a first gas pressure to a second gas pressure, wherein the valve assembly further comprises a protection device arranged in connection with and configured to interact with the inner valve unit to hinder unintended gas flow into the gas cylinder. The present invention also relates to a gas cylinder having a gas with a pressure and an opening, to a gas delivering system, to a gas consuming system and to a beverage dispensing system.

33 Claims, 40 Drawing Sheets

(52) U.S. Cl.
    CPC .............. *F17C 2205/0332* (2013.01); *F17C 2205/0338* (2013.01); *F17C 2205/0341* (2013.01); *F17C 2205/0385* (2013.01)

(56) References Cited

FOREIGN PATENT DOCUMENTS

| EP | 0 708 281 | 4/1996 |
|---|---|---|
| GB | 2 089 954 | 6/1982 |
| GB | 2 349 200 | 10/2000 |
| WO | 2013/076263 | 5/2013 |

OTHER PUBLICATIONS

International Search Report and Written Opinion of the ISA for PCT/EP2018/083749 dated Mar. 21, 2019, 12 pages.
First Office Action dated Jan. 19, 2022 in Chinese Application No. 2018101500686, with English translation, 15 pages.

\* cited by examiner

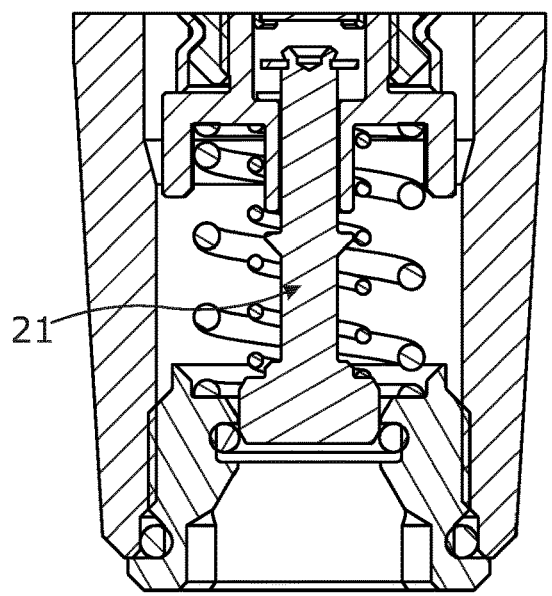
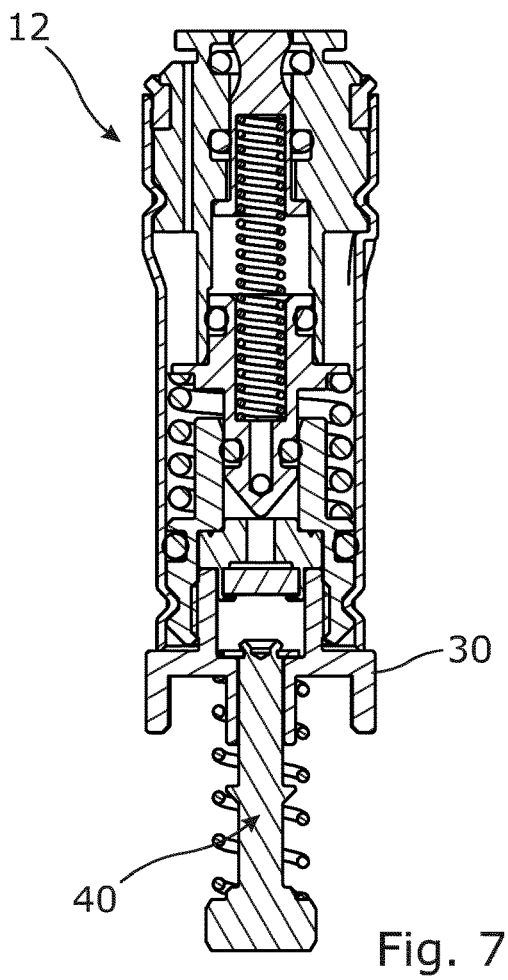
Fig. 6
Fig. 7
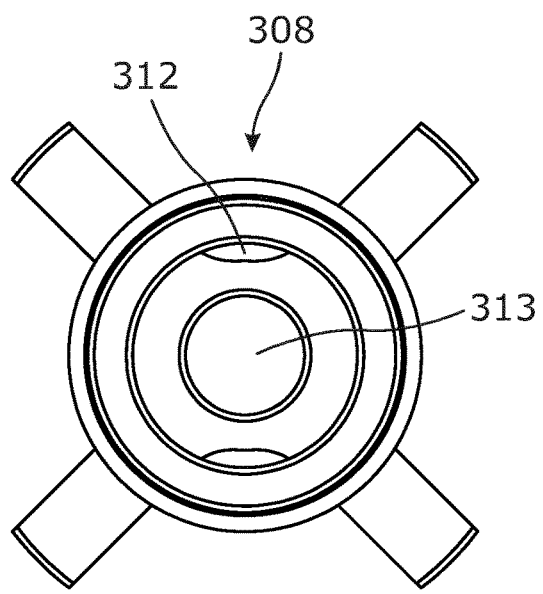
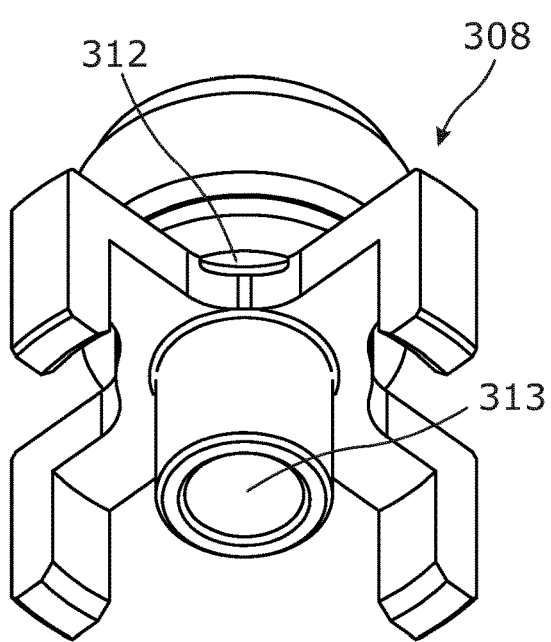
Fig. 8
Fig. 9

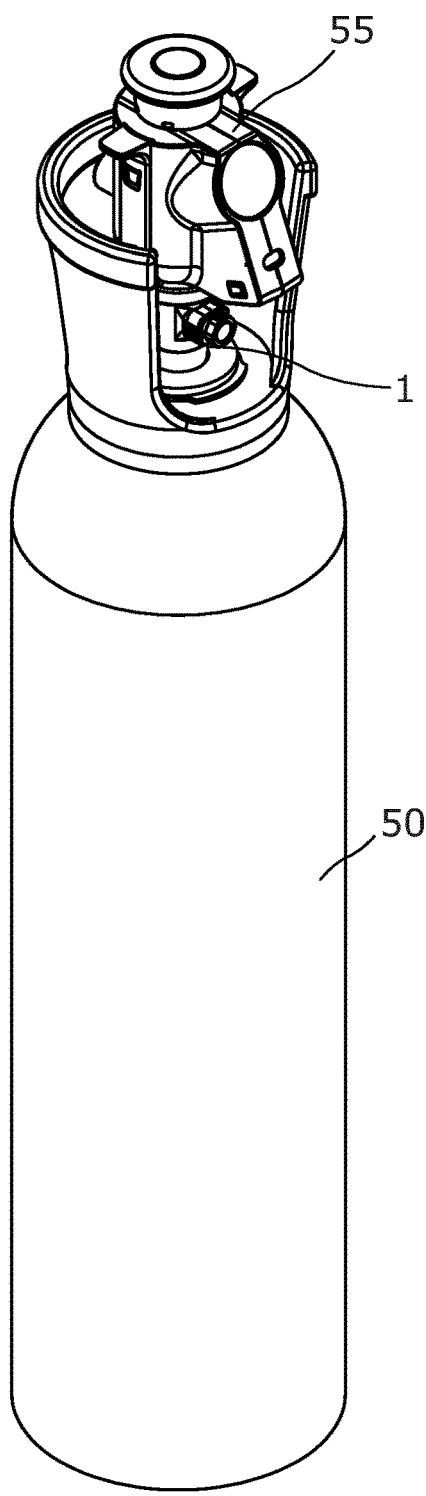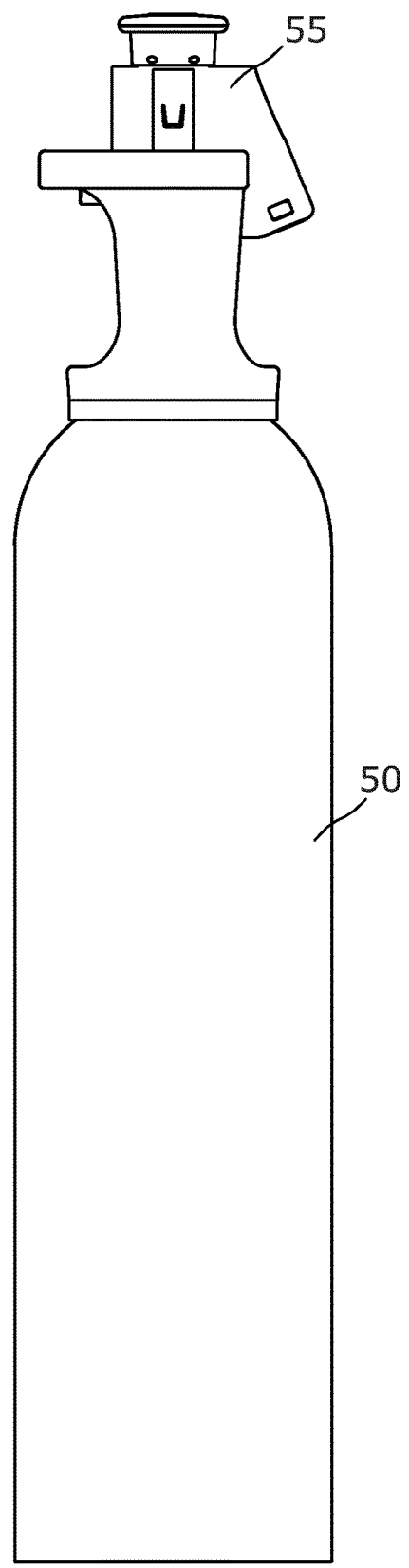
Fig. 26a
Fig. 26b

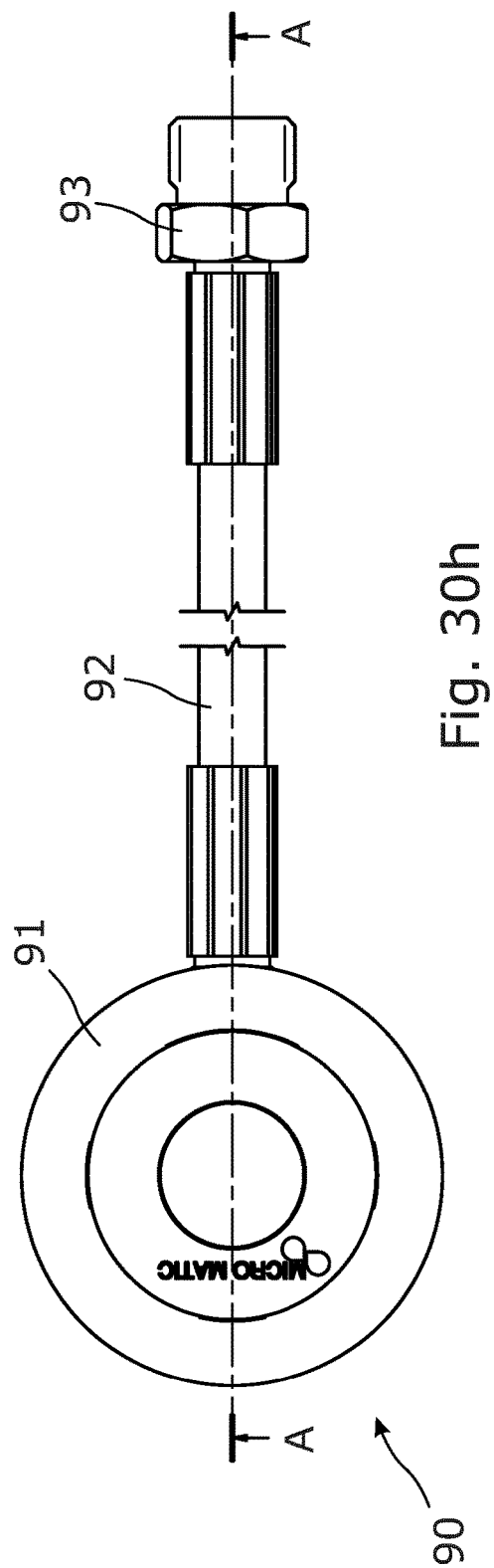
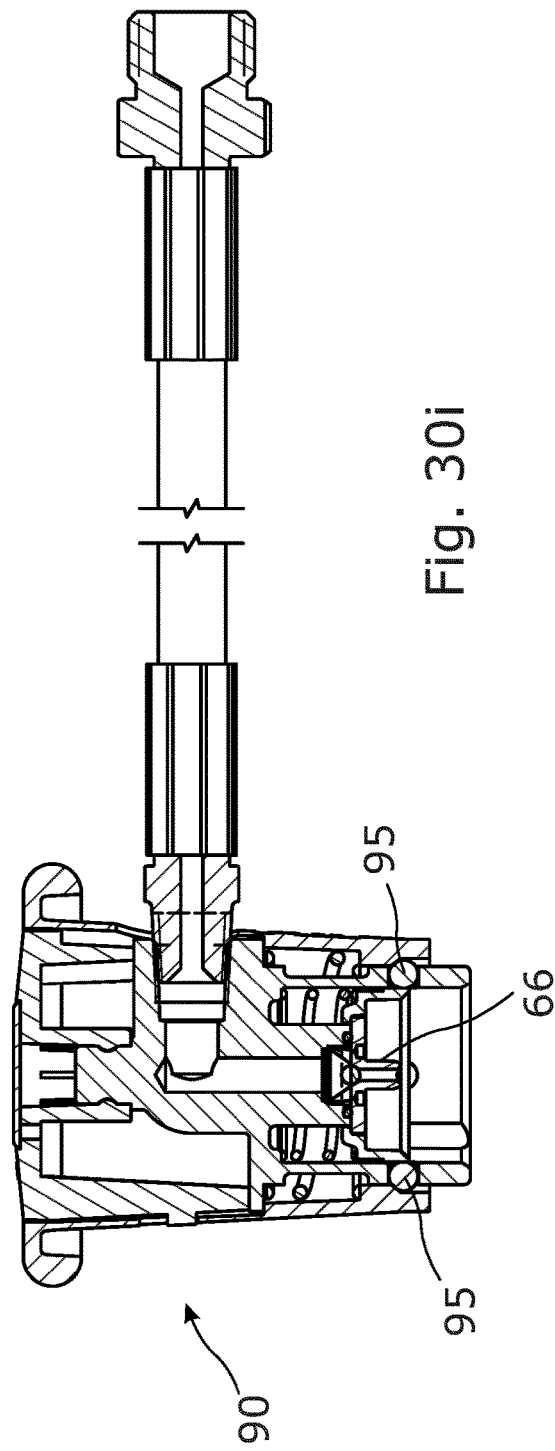
Fig. 30h
Fig. 30i

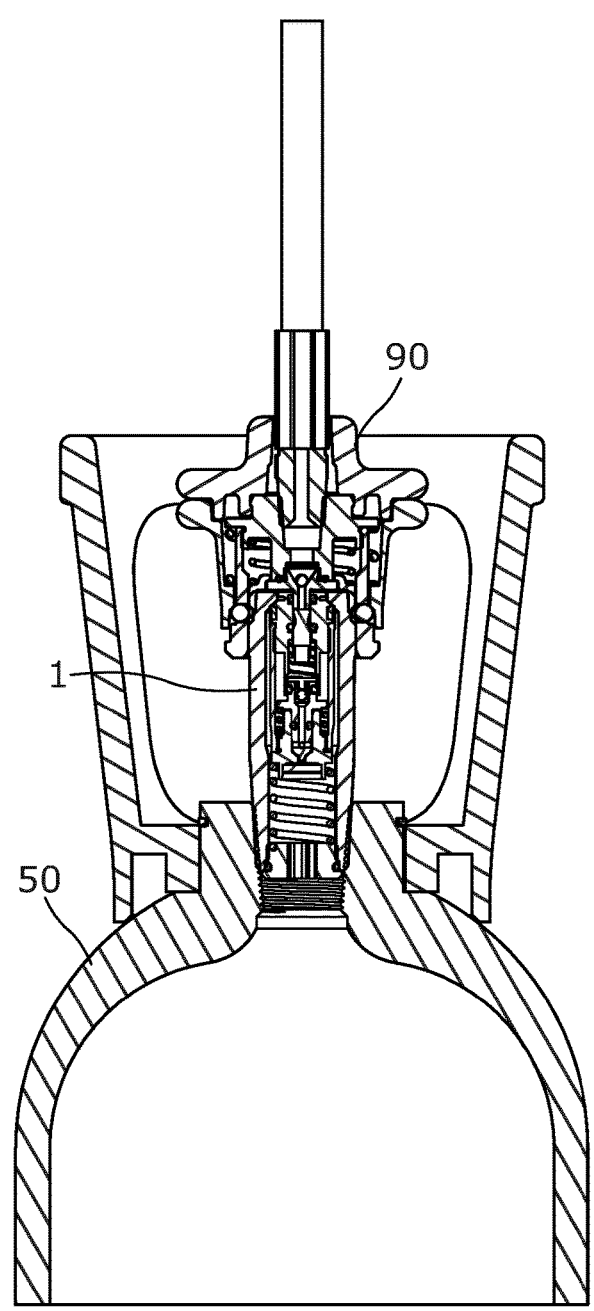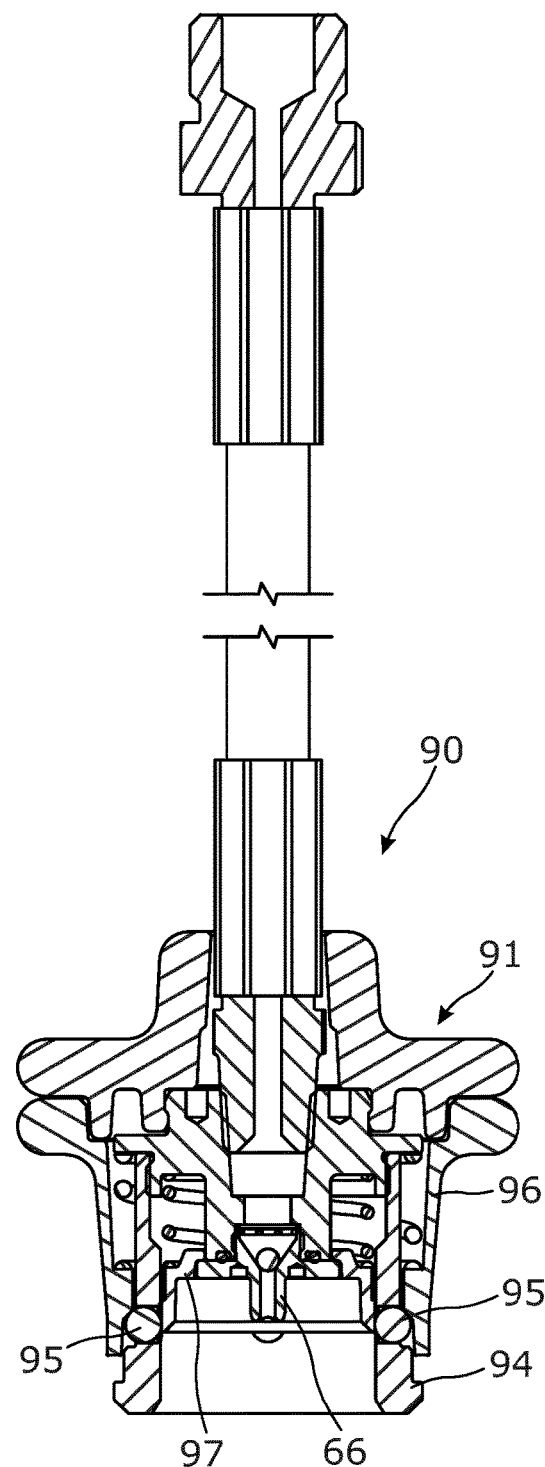
Fig. 32
Fig. 33

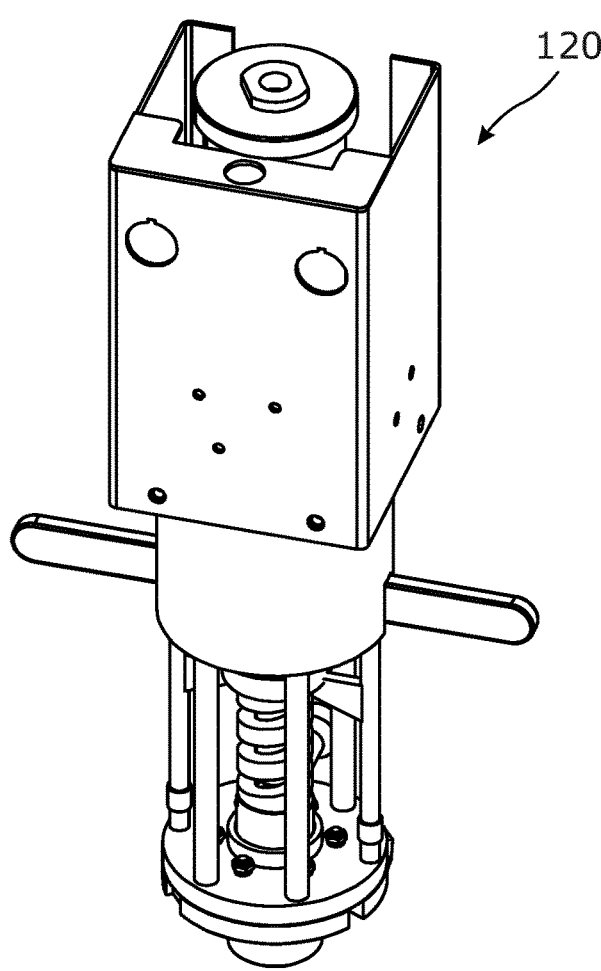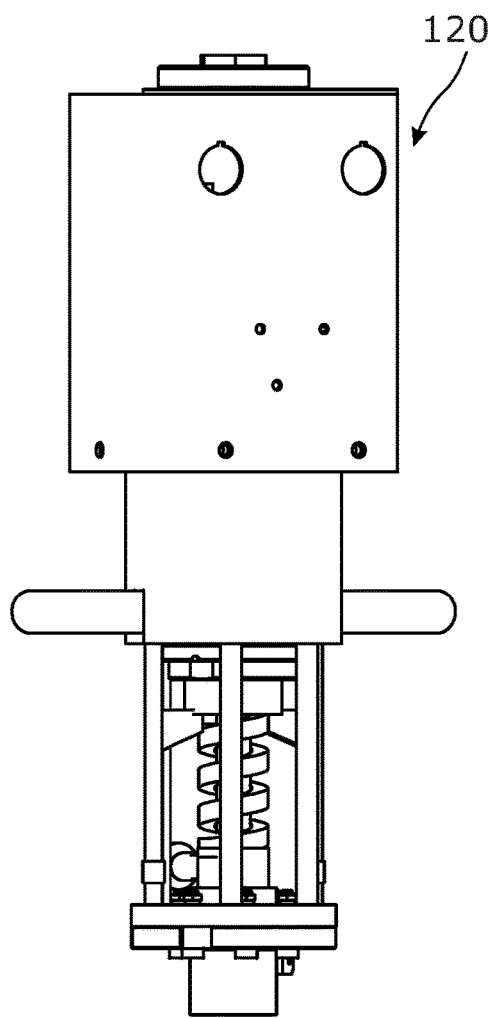
Fig. 36a    Fig. 36b
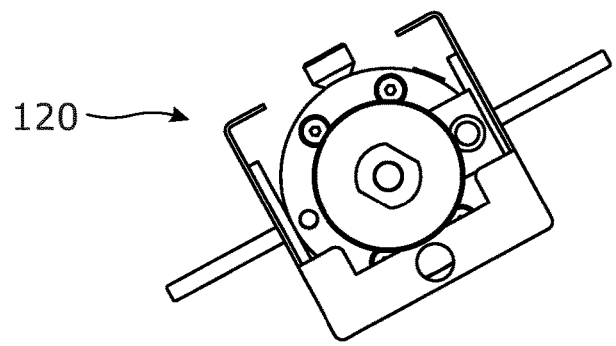
Fig. 36c

VALVE ASSEMBLY

This application is the U.S. national phase of International Application No. PCT/EP2018/083749 filed Dec. 6, 2018 which designated the U.S. and claims priority to EP Patent Application Nos. 17205649.1 filed Dec. 6, 2017, and 18205644.0 filed Nov. 12, 2018, the entire contents of each of which are hereby incorporated by reference.

The present invention relates to a valve assembly configured to be arranged in a cylinder opening of a gas cylinder. The present invention also relates to a gas cylinder having a gas with a pressure and an opening, to a gas delivering system, to a gas consuming system and to a beverage dispensing system.

Known pressure delivery systems for delivering gas to a gas consuming system involve a high risk as well as a high level of discomfort for the users handling the gas cylinders due to their a high pressure.

The users are normally trained in handling these high pressure gas cylinders, and in particular in connecting and disconnecting the gas cylinders to/from the gas consuming systems.

Since gas cylinders have a high outlet pressure, they are often connected by means of tools. The connection is often a threaded connection where a suitable tool is used to screw a connector onto a connecting pipe on the gas cylinder. However, many trained users do not like this way of handling gas cylinders.

Especially when pressure delivery systems are used in connection with beverage dispensing systems, there is a common fear among many users handling gas cylinders with a high gas pressure.

When beverage dispensing systems are used in bars, restaurants or the like, the staff is required to replace the gas cylinders when they are empty. However, the staff often objects to exchanging the gas cylinders due to a combination of insufficient training in handling high pressure gas cylinders, lack of experience with the use of the necessary tools, and the fact that the gas cylinders are often installed in places where they are difficult to reach. As a result, the gas cylinders are not replaced until a person with adequate courage and skills arrives.

From WO 2013/076263 A1 a valve assembly is known.

It is an object of the present invention to wholly or partly overcome the above disadvantages and drawbacks of the prior art. More specifically, it is an object to provide an improved valve assembly for a gas cylinder, facilitating the handling of the gas cylinders and at the same time protecting the gas cylinders.

The above objects, together with numerous other objects, advantages and features, which will become evident from the below description, are accomplished by a solution in accordance with the present invention by a valve assembly configured to be arranged in a cylinder opening of a gas cylinder, comprising:
- a valve housing having
  - a first housing end and a second housing end,
  - a first housing opening arranged at the first housing end and a second housing opening arranged at the second housing end, the first housing opening having an inner diameter, and
  - a bore extending between the first housing opening and the second housing opening, the bore having an inner face, and
- an inner valve unit arranged in the bore, said inner valve unit having
  - an inner valve housing, and
  - a first end and a second end,
  - the first end having an outer diameter, the outer diameter being larger than the inner diameter of the first housing opening, the first end being configured to abut the inner face at the first opening, whereby a filling valve is provided, the inner face of the first opening being a filling valve seat,
  - the second end comprising an inlet to the inner valve unit, the inner valve unit further comprising:
  - a consumption valve arranged at the first end, and
  - a first pressure reduction valve configured to reduce a pressure in the gas cylinder from a first gas pressure to a second gas pressure, wherein the valve assembly further comprises a protection device arranged in connection with and configured to interact with the inner valve unit to hinder unintended gas flow into the gas cylinder.

Also, the protection device may comprise a residue pressure valve and a non-return valve, the residue pressure valve being configured to ensure that the gas cylinder will maintain a predetermined overpressure so that a flow of gas is hindered into the gas cylinder, and the non-return valve is configured to ensure that the gas cylinder unintendedly can be filled through the consumption valve.

Furthermore, the residue pressure valve may comprise a first closing part being configured to abut a residue pressure valve seat.

Moreover, the first closing part may comprise a first part end and a second part end, the first part end being closest to the inner valve unit and the second part end comprising a radially extending abutment flange having an outer flange diameter, the radially extending abutment flange being configured to abut the residue pressure valve seat, the residue pressure valve seat being an inner bore of the valve assembly and having an inner bore diameter, the inner bore diameter being substantially equal to the outer flange diameter.

The inner bore may comprise a circumferential groove wherein a sealing element is arranged.

In addition, a bottom piece may be arranged in the inlet, the bottom piece comprising one or more piece opening(s) fluidly connecting the inner valve unit with the bore.

Also, the bottom piece may comprise a piece bore, the first end part of the first closing part being arranged movably in the piece bore, and the first end part comprising a pin being larger than the piece bore ensuring that the first closing part is maintained in relation to the bottom piece.

Moreover, the residue pressure valve may have a first spring exerting a first predetermined spring force on the first closing part, so that the first closing part is configured to abut the residue pressure valve seat when the pressure inside the gas cylinder is lower than the first predetermined spring force.

Further, the first predetermined force may be between 2 and 8 bar, preferably between 3 and 5 bar.

The first spring may be extending between the bottom piece and the abutment flange.

Additionally, the first pressure reduction valve may comprise a second closing part configured to abut a pressure reduction valve seat, the second closing part having a second abutment face, the second abutment face being made of a semi-rigid or rigid material.

Also, the first pressure reduction valve may be configured to be kept open above a predetermined pressure level.

Said predetermined pressure level may correspond to the second gas pressure.

Moreover, the predetermined pressure level may be between 25 and 45 bar, preferably around and above 35 bar.

The inner valve unit may have an outer unit diameter and the second closing part has an outer closing diameter in the opposite end of the end abutting the pressure reduction valve seat, the outer unit diameter and the outer closing diameter interact together with the abutment flange as the non-return valve.

Further, the first pressure reduction valve may have a second spring exerting a second predetermined pressure in the opposite direction of the pressure reduction valve seat, so that the second closing part is configured be away from the pressure reduction valve seat when the gas pressure inside the gas cylinder is lower than the second predetermined pressure.

Additionally, the inner valve housing may be a third closing part of the filling valve, a third spring being arranged in the bore so that the inner valve housing is forced against the filling valve seat.

The valve housing may have an outer face at the first housing end, the outer face comprising first connection means configured to receive corresponding second connection means of a pressure regulator or an adaptor unit.

Also, the first connection means may be a circumferential groove.

A filter element may be arranged upstream of the first reduction valve in view of the gas cylinder.

In addition, the outer face at the second housing end may be configured to be connected with the opening of the gas cylinder.

Also, the outer face at the second housing end may comprise a male thread area configured to be screwed into a female thread area arranged in the opening of the gas cylinder.

Moreover, the consumption valve and the first pressure reduction valve may be arranged inside the inner valve housing. The protection device may be arranged to interact with the inner valve unit.

Additionally, the filling valve may be arranged concentrically around the inner valve unit.

Further, the consumption valve may be configured to be opened by an external pressure body.

The first pressure reduction valve may be arranged at the inlet to the inner valve unit so that the pressure of the gas in the gas cylinder is reduced to the second pressure before leaving the consumption valve.

In an embodiment, a filter element may be arranged upstream of the first reduction valve.

Furthermore, a plug may be arranged in the bore at the second housing end, the plug having an aperture allowing gas flowing into the valve assembly.

The valve assembly according to the present invention may further comprise a pressure relief valve.

Furthermore, a venting channel is arranged in the inner valve unit, the venting channel being configured to vent the inside of the inner valve unit.

In addition, when the valve assembly is arranged in the cylinder opening of the gas cylinder, the valve assembly may comprise a protective cap at the first housing end. The protective cap is configured to protect the valve assembly against contamination during transport and storage. The protective cap may also function as a tamper-evident.

The present invention also relates to a gas cylinder having a gas with a pressure and an opening, wherein the valve assembly according to the present invention may be arranged in the opening.

Further, the present invention relates to a gas delivering system for delivering a gas pressure to a gas consuming system, comprising:

gas cylinder according to the present invention having a valve assembly according to the present invention, and
a gas pressure regulation device being connected with the first housing end of the valve housing.

The gas pressure regulation device may comprise a second pressure reduction valve configured to reduce the second gas pressure to a third gas pressure.

Also, the second gas pressure or third gas pressure may be a predetermined consumption gas pressure.

Moreover, the gas pressure regulation device may comprise regulation means for regulating the second gas pressure to the third gas pressure.

The gas delivering system according to the present invention may further comprise an adaptor unit configured to be connected with the first housing end of the valve housing and in the opposite end with the gas pressure regulation device. Hereby it is obtained that the gas pressure regulation device may be positioned at a distance from the gas cylinder.

In addition, the adaptor unit or the gas pressure regulation device may comprise corresponding second connection means so that connection of the adaptor unit and/or the gas pressure regulation device to the valve assembly is facilitated.

Further, the adaptor unit or the gas pressure regulation device may comprise a male part and the valve assembly may comprise a female part, or vice versa.

Also, the male part may comprise locking means adapted to mechanically engage corresponding locking means arranged in the female part.

Furthermore, the gas pressure regulation device may comprise an acoustic click indicator sending a signal when the gas pressure regulation device is correctly connected to the valve assembly and/or a visual indicator for indicating when the gas pressure regulation device is correctly connected to the valve assembly.

The gas delivering system as described above may comprise a tamper evident strip, the tamper evident strip being configured to be inserted into holes in the gas pressure regulation device.

The gas delivering system as described above may further comprise a tool configured to connect and disconnect the valve assembly to/from the opening of the gas cylinder.

Further, the gas delivering system as described above may comprise a gas filling device configured to be connected with the valve assembly and to open the gas filling valve of the valve assembly to a filling position.

The present invention also relates to a gas consuming system comprising a gas delivering system according to the present invention.

Said gas consuming system may be a beverage dispensing system, a welding system, a medical dispensing system, or a similar system utilising gas.

The present invention also relates to a beverage dispensing system for dispensing beverages, comprising a gas delivering system according to the present invention.

According to another aspect, a valve assembly configured to be arranged in a cylinder opening of a gas cylinder, may comprise:
  a valve housing having
    a first housing end and a second housing end,
    a first housing opening arranged at the first housing end and a second housing opening arranged at the second housing end, the first housing opening having an inner diameter, and
    a bore extending between the first housing opening and the second housing opening, the bore having an inner face, and an inner valve unit arranged in the bore, said inner valve unit having
an inner valve housing, and
a first end and a second end,
the first end having an outer diameter, the outer diameter being larger than the inner diameter of the first opening, the first end being configured to abut the inner face at the first opening, whereby a filling valve is provided, the inner face of at the first opening being a filling valve seat,
the second end comprising an inlet to the inner valve unit,
the inner valve unit further comprising:
a consumption valve arranged at the first end,
a first pressure reduction valve configured to reduce a pressure in the gas cylinder from a first gas pressure to a second gas pressure, and
a residue pressure valve,
wherein the residue pressure valve is arranged downstream of the first pressure reduction valve in relation to the inlet.

The residue pressure valve may be arranged between the first reduction valve and the consumption valve inside the inner valve housing.

Also, the residue pressure valve may comprise a first closing part configured to abut a residue pressure valve seat, the first closing part having a first abutment face, the first abutment face being made of a semi-rigid or soft material.

In addition, the residue pressure valve seat may be made of a semi-rigid or soft material.

The first pressure reduction valve may be arranged at the inlet to the inner valve unit so that the pressure of the gas in the gas cylinder is reduced to the second pressure before leaving the consumption valve.

In another embodiment, a filter element may be arranged upstream of the first reduction valve.

The invention and its many advantages will be described in more detail below with reference to the accompanying schematic drawings, which for the purpose of illustration show some non-limiting embodiments and in which:

FIGS. 1a-1d show a valve assembly according to the present invention,

FIG. 2 is a cross-sectional view of a valve assembly according to the present invention in closed position, FIG. 3 is a cross-sectional view of the valve assembly of FIG. 2 in an open position, FIG. 4 is a cross-sectional view of the valve assembly of FIG. 2 in a filling position, FIG. 5 is a cross-sectional view of the valve assembly of FIG. 2 in a degassing and vacuuming position, FIG. 6 is a cross-sectional view of a part of the valve assembly, FIG. 7 is a cross-sectional view of the inner valve unit, FIGS. 8-11 show different views of the bottom piece, FIGS. 12-14 show different positions of the valve assembly when mounted in a gas cylinder, FIG. 15 is a cross-sectional view of an embodiment of a valve assembly in a closed position, FIG. 16 is a cross-sectional view of the valve assembly of FIG. 15 in an open position, FIG. 17 is a cross-sectional view of the valve assembly of FIG. 15, in which the residue pressure valve is closed, FIG. 18 is a cross-sectional view of the valve assembly of FIG. 15 with the filling valve open, FIGS. 19a-19c show a valve assembly arranged in a gas cylinder, FIGS. 20a-20d show a gas pressure regulation device, FIGS. 21-24 show cross-sectional views of the gas pressure regulation device, FIGS. 25a-25c show a gas pressure regulation device with a tamper-evident strips, FIGS. 26a-26b show the pressure regulation connected with the valve assembly arranged in the gas cylinder, FIGS. 27-29 show cross-sectional views of the gas pressure regulation device connected with the valve assembly arranged in the gas cylinder, FIGS. 30a-30f show an adaptor unit to be connected with the valve assembly, FIGS. 30g-30i show another adaptor unit to be connected with the valve assembly, FIGS. 31a-31b show the adaptor unit connected with the valve assembly arranged in the gas cylinder, FIGS. 32-33 show cross-sectional views of the adaptor unit connected with the valve assembly arranged in the gas cylinder, FIGS. 34a-34c show a tool configured to connect and disconnect the valve assembly to/from the opening of the gas cylinder, FIGS. 35a-35c show the tool of FIGS. 34a-34c arranged on the valve assembly, FIGS. 36a-36c show a gas filling device configured to be connected with the valve assembly and to open the gas filling valve of the valve assembly to a filling position, FIGS. 37a-37e show the gas filling device of FIGS. 36a-36c arranged on the valve assembly, FIGS. 38-40 show a gas consuming system in the form of a beverage dispensing system, and FIGS. 41-43 show another beverage dispensing system.

All the figures are highly schematic and not necessarily to scale, and they show only those parts which are necessary in order to elucidate the invention, other parts being omitted or merely suggested.

FIGS. 1a-1d show a valve assembly 1 according to the present invention from the outside in different views. The valve assembly 1 comprises several valves which each has different functions. This will be described further below. The valve assembly 1 is configured to be connected with a cylinder opening of a gas cylinder. The valve assembly 1 comprises a valve housing 2 having a first housing end 3 and a second housing end 4. The valve housing 2 has an outer face 5 at the first housing end 3, and the outer face 5 comprises first connection means 6 configured to receive corresponding second connection means of a gas pressure regulation device or an adaptor unit (not shown). In the present embodiment, the first connection means 6 is a circumferential groove.

The outer face 5 at the second housing end 4 is configured to be connected with the cylinder opening of the gas cylinder (not shown). In the present embodiment, the outer face 5 at the second housing end 4 comprises a male thread area 7 configured to be screwed into a female thread area arranged in the cylinder opening of the gas cylinder (not shown).

The valve housing 2 may be made of cast metal such as brass or similar materials.

FIG. 2 shows a cross-sectional view of an embodiment of a valve assembly 1 according to the invention. The valve assembly 1 in FIG. 2 is its closed position. The valve assembly 1 comprises the valve housing 2 having the first housing end 3 and a second housing end 4, a first housing opening 8 arranged at the first housing end 3 and a second housing opening 9 arranged at the second housing end 4, the first opening 8 having an inner diameter Di. The valve housing 2 further comprises a bore 10 extending between the first housing opening 8 and the second housing opening 9, the bore 10 having an inner face 11.

Furthermore, an inner valve unit 12 is arranged in the bore 10, the inner valve unit 12 having an inner valve housing 13, a first end 14 and a second end 15. The first end 14 has an outer diameter Do, the outer diameter Do being larger than the inner diameter Di of the first opening 8, the first end 14 being configured to abut the inner face 11 at the first opening 8, whereby a filling valve 16 is provided. The second end of the inner valve unit 12 comprises an inlet 17 to the inner valve unit 12, the inner face 11 of the valve housing 2 at the first housing opening 8 being a filling valve seat 18.

The inner valve unit 12 further comprises a consumption valve 19 arranged at the first end 14 and a first pressure reduction valve 20 configured to reduce a pressure in the gas cylinder from a first gas pressure to a second gas pressure.

The valve assembly 1 further comprises a protection device 300 arranged in connection with and configured to interact with the inner valve unit 12 to hinder unintended gas flow into the gas cylinder. Hereby, it is obtained that the gas cylinder is protected against being contaminated by outside gasses when it is close to be empty and that unauthorised filling of the gas cylinder cannot occur via for instance the consumption valve 19.

The protection device 300 comprises a residue pressure valve 21 and a non-return valve 301, the residue pressure valve 21 is configured to ensure that the gas cylinder will maintain a predetermined overpressure, so that a flow of gas is hindered into the gas cylinder, and the non-return valve 301 is configured to ensure that the gas cylinder unintendedly can be filled through the consumption valve 19.

The residue pressure valve 21 comprises a first closing part 40 being configured to abut a residue pressure valve seat 41.

In the present embodiment, the first closing part 40 comprises a first part end 302 and a second part end 303, the first part end 302 being closest to the inner valve unit 12 and the second part end 303 comprising a radially extending abutment flange 304 having an outer flange diameter Dof, the radially extending abutment flange 304 being configured to abut the residue pressure valve seat 41, the residue pressure valve seat 41 being an inner bore 305 of the valve assembly 1 and having an inner bore diameter Dib, the inner bore diameter being substantially equal to the outer flange diameter. In the present embodiment, the inner bore 305 is arranged in a plug 46 arranged in the bore 10 at the second housing end 4, the plug 46 having an aperture 47 allowing gas to flow into the valve assembly 1. The plug 46 functions as support for the third spring 45. The plug 46 may have a threaded area which may be screwed into a similar threaded area of the inner face of the valve housing 2.

The inner bore 10 comprises a circumferential groove 306 wherein a sealing element 307 is arranged.

Furthermore, a bottom piece 308 is arranged in the inlet 17, the bottom piece 307 comprising one or more piece opening(s) (not shown) fluidly connecting the inner valve unit 12 with the bore 10. The bottom piece 308 comprises a piece bore 309, the first end part 302 of the first closing part 303 being arranged movably in the piece bore 309, and the first end part comprising a pin 310 being larger than the piece bore 309 ensuring that the first closing part 40 is maintained in relation to the bottom piece 308 and thereby the inner valve unit. The residue pressure valve 21 has a first spring 43 exerting a first predetermined spring force on the first closing part 40, so that the first closing part 40 is configured to abut the residue pressure valve seat 41 when the pressure inside the gas cylinder is lower than the first predetermined spring force. The first spring 43 is extending between the bottom piece 308 and the abutment flange 304.

In FIG. 3, the valve assembly 1 is shown in a cross-sectional view. In FIG. 3, the consumption valve 19 has been activated so that it is open to deliver gas to the gas consuming system. The consumption valve 19 has been opened by an external pressure body (not shown). The consumption valve 19 comprises a closing member 22 arranged in an inner bore 23 of the inner valve housing 13. The consumption valve 19 has a consumption valve spring 24 forcing the closing member 22 upwards to the closed position of the consumption valve 19 (as shown in FIG. 2). The inner bore 23 has an upper groove 25 and a lower groove 26 arranged at a distance to each other. In the upper groove 25 and lower groove 26 sealing elements 27 are arranged. At least the sealing element 27 arranged in the lower groove 26 seals off around the closing member 22 when it is in the closed position. The closing member 22 has a narrowing area where the diameter of the closing member 22 is smaller than the rest of the closing member so that, in the open position as shown in FIG. 3, the gas may flow past the closing member 22 between the inner bore 23 and the closing member 22.

When the consumption valve 19 is to be opened, the external pressure body presses on the closing member 22 with a force greater than the force of the consumption valve spring 24 and the regulated pressure of the gas cylinder.

The first pressure reduction valve 20 is configured to reduce a pressure in the gas cylinder from a first gas pressure to a second gas pressure. The first pressure reduction valve 20 comprises a second closing part 28 configured to abut a pressure reduction valve seat 29. The second closing part 28 has a second abutment face 30, and the second abutment face 30 is made of a semi-rigid or rigid material. The second closing part 28 has a member bore 31 through which the gas may flow.

The reduction of pressure is provided by a first part area 35 arranged upstream of a second part area 36, the first part area 35 being larger than the second part area 36 seen in the flow direction of the gas. The first part area 35 and the second part area 36 are the cross-sectional areas in the flow direction of the gas.

The first pressure reduction valve 20 is configured to be kept open above a predetermined pressure level. The predetermined pressure level corresponds to the second gas pressure. Hence, when the first gas pressure, i.e. the gas pressure present in the gas cylinder, is equal to the second gas pressure, the first pressure reduction valve 20 does not reduce the gas pressure, and therefore it is kept open.

The predetermined pressure level may be between 25 and 45 bar, preferably around and above 35 bar.

The first pressure reduction valve 20 has a second spring 32 exerting a second predetermined pressure in the opposite direction of the pressure reduction valve seat 30, so that the second closing part 28 is configured to be away from the pressure reduction valve seat 30 when the gas pressure inside the gas cylinder is equal to or lower than the second predetermined pressure.

In FIG. 3, when the closing member 22 has been moved downwards and past the upper sealing element 27, so that the gas present in the gas cylinder having a first gas pressure may flow via a filter element 33 to the first pressure reduction valve 20. In the first pressure reduction valve 20, the second closing part 28 has been displaced slightly upwards, so that a gap exists between the pressure reduction valve seat 30 and the second closing part 28, whereby the gas may flow though this gap and into the member bore 31. The first gas pressure is reduced accordingly to a second gas pressure as described above.

The filter element 33 is arranged at the inlet 17 to the inner valve unit 12 for filtering the gas before it enters the inner valve unit 12.

The valve assembly 1 also comprises a pressure relief valve 34 arranged between the first housing end 3 and the second housing end 4. The pressure relief valve 34 projects radially out from the outer face 5 of the valve housing 2. The pressure relief valve 34 comprises a burst disc 37 which is set to burst at a predetermined pressure. In addition, the pressure relief valve 34 comprises one or more outlets 38 for letting the gas out into the surroundings after the burst disc 37 has burst. Preferably, the outlets are in the axial direction of the valve assembly 1, so that it is avoided that the gas cylinder is over-turned when the gas relieves via the pressure relief valve 34.

The residue pressure valve 21 is open in FIG. 3. In addition, the pin 310 of the first closing part 40 has been moved upwards as seen in FIG. 3. The outer flange diameter Dof defines a cross-sectional area, when this area is exerted of a pressure from inside the gas cylinder which is less than the spring force of the first spring 43, the spring force will ensure that the residue pressure valve 21 is closed (as seen in FIG. 2).

Furthermore, the non-return valve 301 is configured to interact with the inner valve unit 12 to hinder unintended gas flow into the gas cylinder. The non-return valve 301 is configured to ensure that the gas cylinder cannot unintendedly be filled through the consumption valve 19.

The inner valve unit 12 has an outer unit diameter 311, thereby defining a cross-sectional unit area 311, and the second closing part has an outer closing diameter, corresponding to first part area 35 in the opposite end of the end abutting the pressure reduction valve seat, the outer unit diameter 311 and the outer closing diameter, i.e. first part area 35, interact together with the abutment flange as the non-return valve 301.

In the circumstance of unauthorised filling of the gas cylinder is attempted through the consumption valve, the elements of the non-return valve 301 interact so that a gas flow is hindered in entering into the gas cylinder. If for instance a 250 bar gas pressure is applied to the consumption valve 19 from the outside, the consumption valve 19 is moved downwards. Then a pressure will be exerted on first part area 35 which will close the reduction valve 20. However, a pressure of approximately 50 bar will then be exerted on the unit area 311. Since the unit area 311 is larger than the cross-sectional area defined by the outer flange diameter Dof, the residue pressure valve 21 will be maintained in its closed position thereby hindering a gas flow into the gas cylinder.

FIG. 4 shows the valve assembly 1 in a position in which the filling valve 16 is open. The filling valve is arranged concentrically around the inner valve unit 12. The filling valve 16 has been opened by a gas filling device which is configured to be connected with the valve assembly 1. The gas filling device will be described further below. When the filling valve 16 is open, the gas cylinder may be filled with gas by by-passing the inner valve unit 12. Furthermore, the residue pressure valve 21 is moved downwards, thereby providing access to the gas cylinder.

FIG. 6 shows in a cross-sectional view the residue pressure valve 21 in the open position.

FIG. 7 shows a cross-sectional view of the inner valve unit 12, the bottom piece 308 and the first closing part 40 of the residue pressure valve.

FIGS. 8-11 show the bottom piece 308 in different views. The bottom piece 308 comprises one or more piece opening (s) 312 fluidly connecting the inner valve unit with the bore. As described above, the bottom piece 308 also comprises a piece bore 313.

Figure 12:
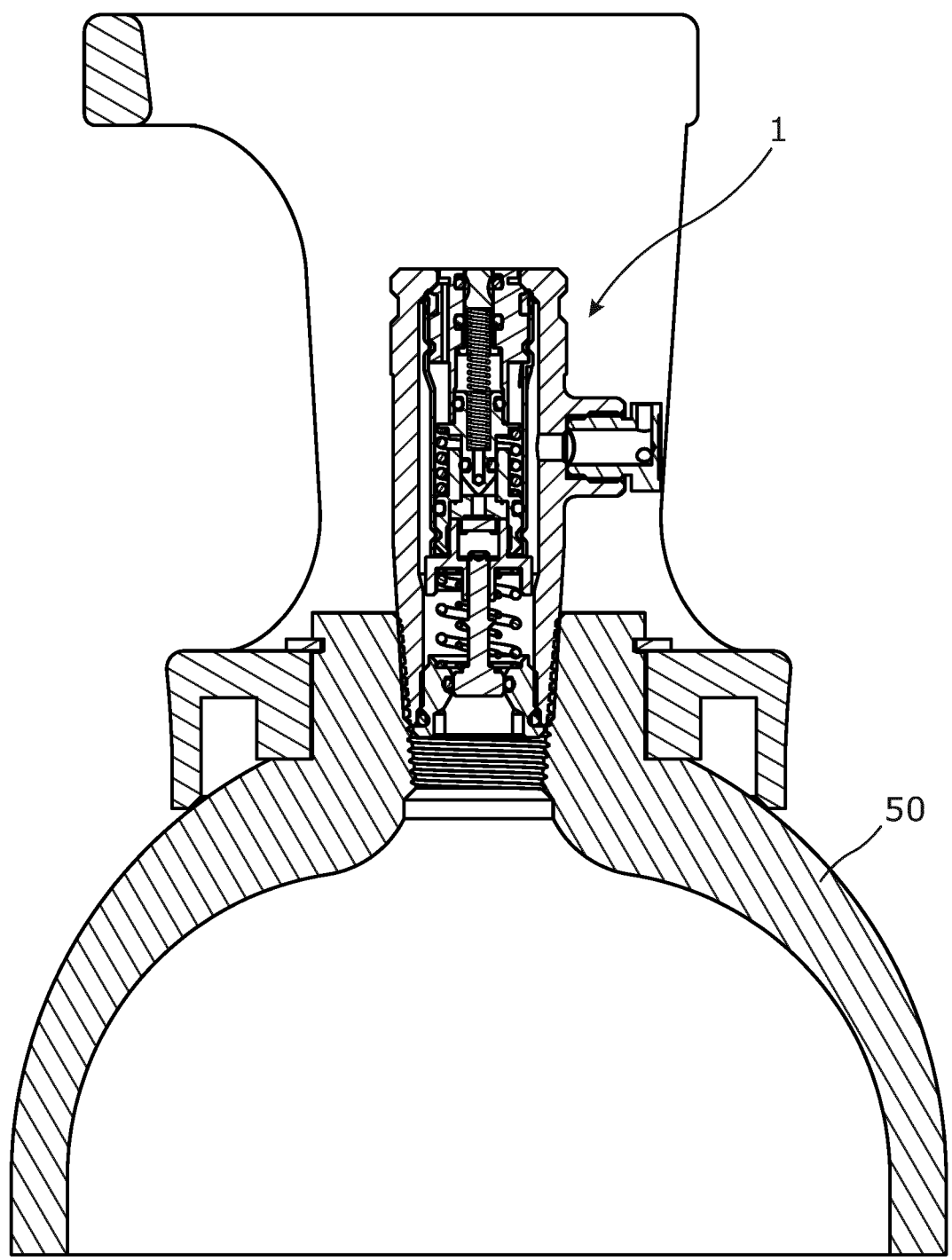
Figure 13:
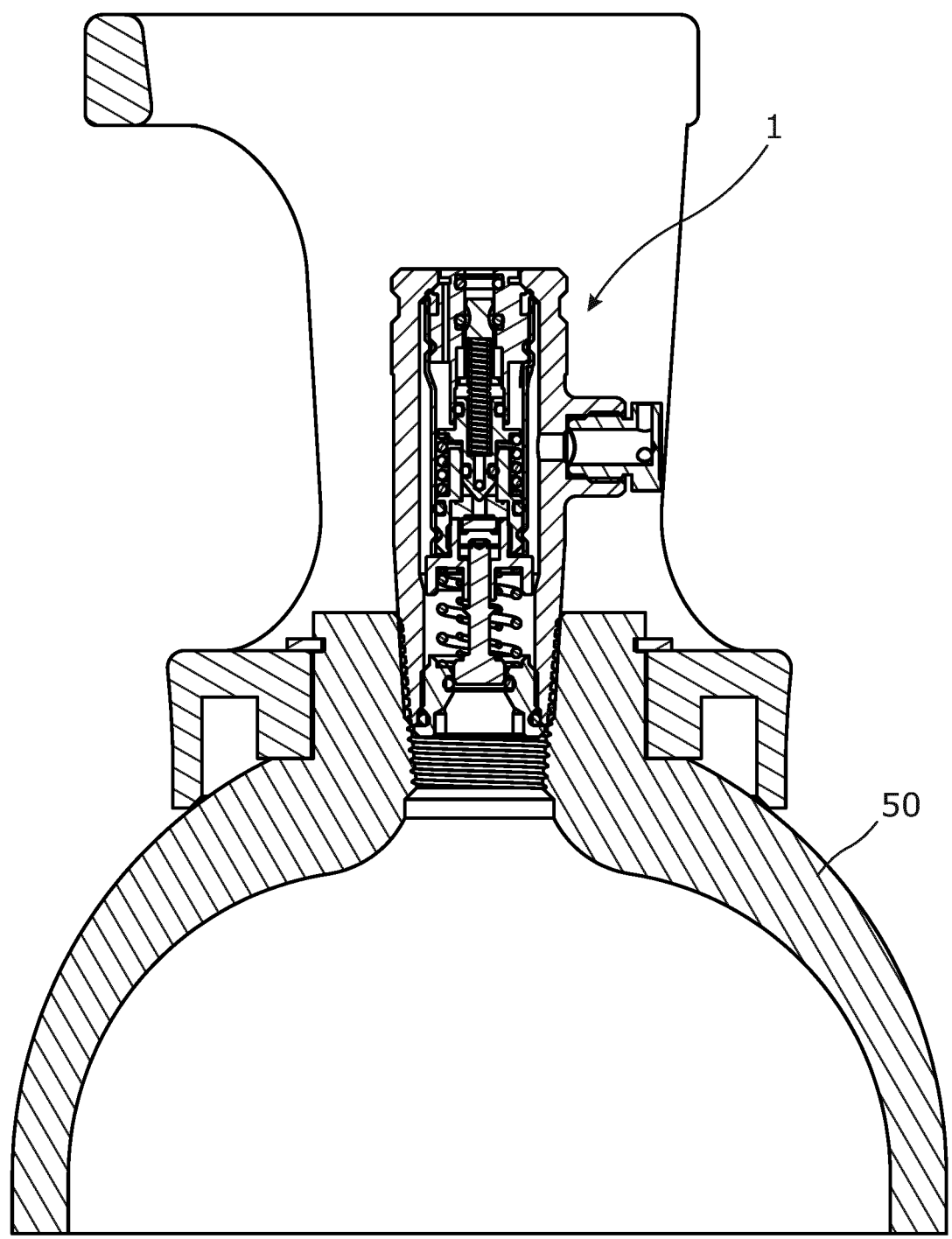
Figure 14:
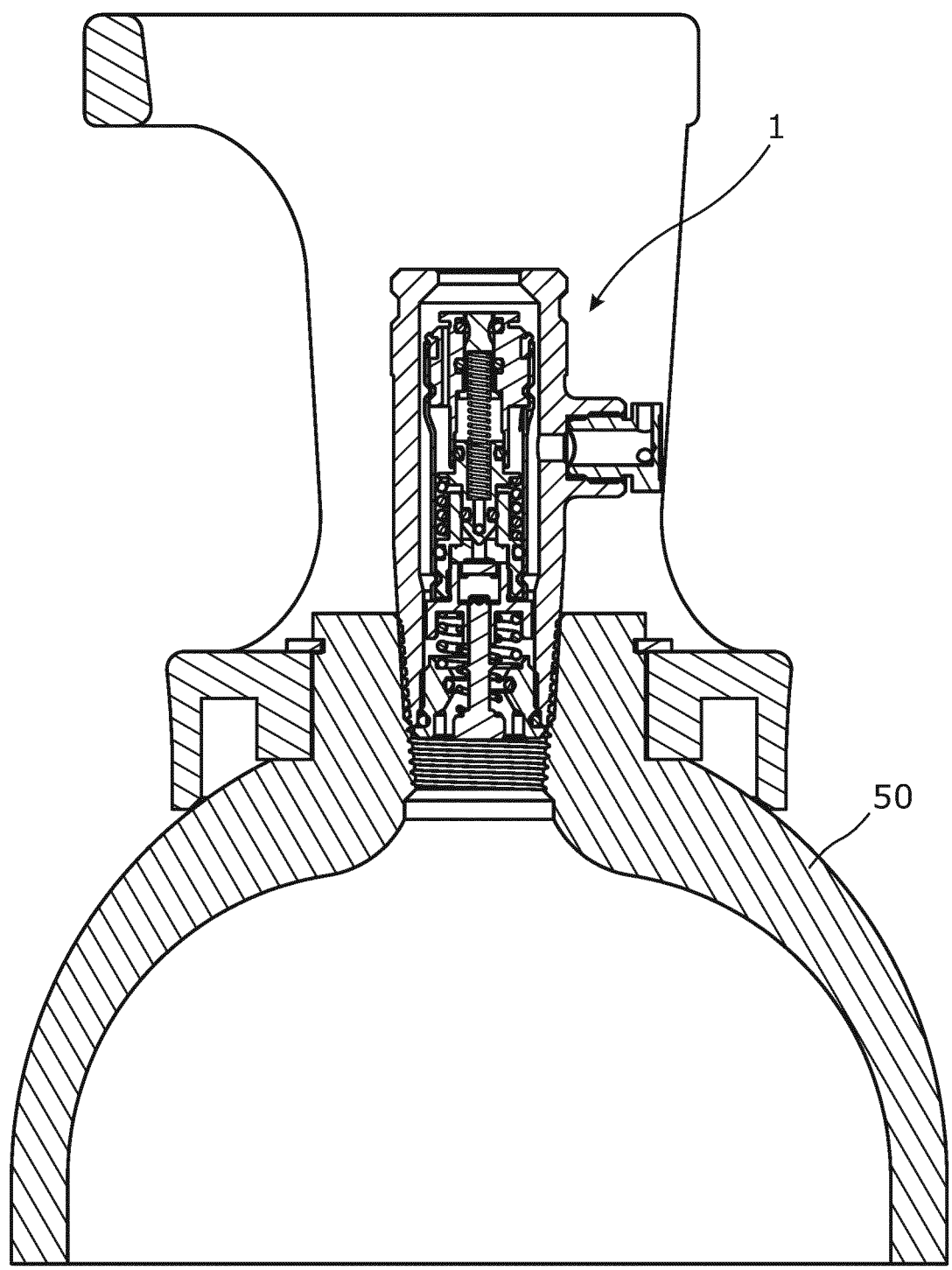

FIGS. 12-14 show in cross-section views the valve assembly 1 arranged in the gas cylinder 50 in different operation positions of the valve assembly. In FIG. 12, the valve assembly 1 is closed. In FIG. 13, the valve assembly 1 is in the consumption position, and in FIG. 14 the valve assembly is in the filling position.

Figure 1A:
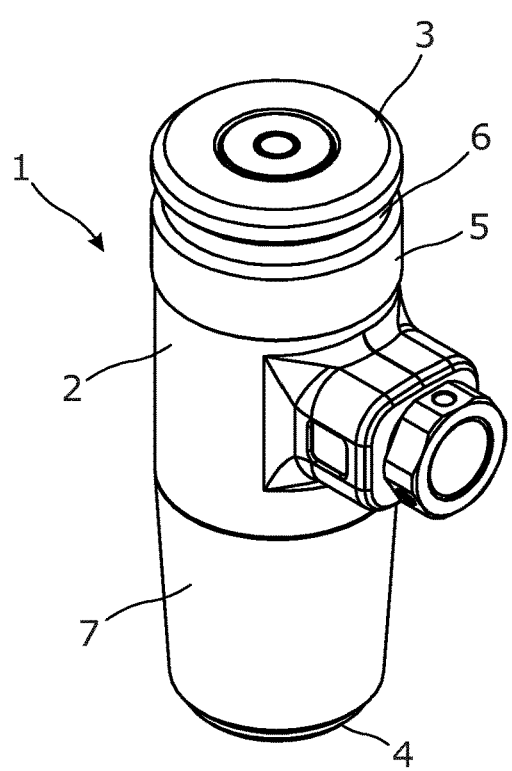
Figure 1B:
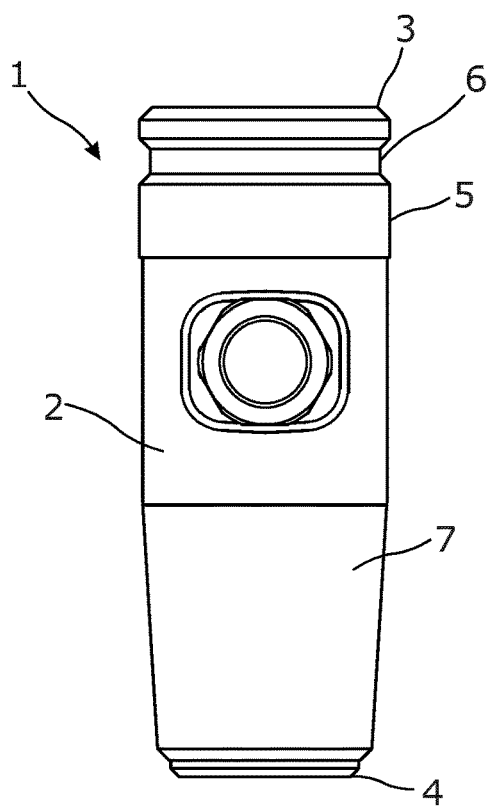
Figure 1C:
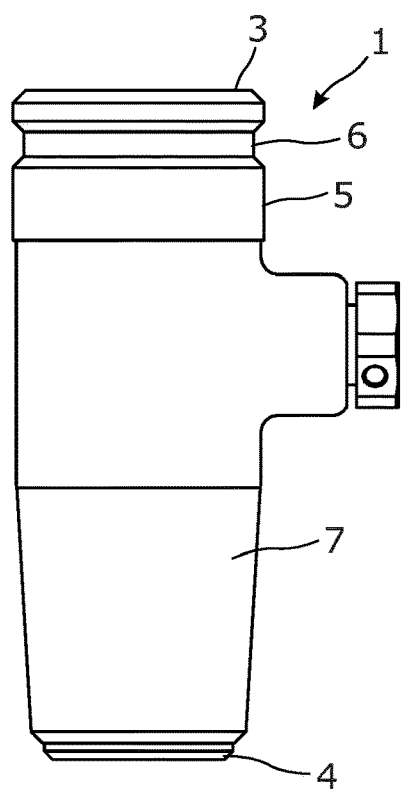
Figure 1D:
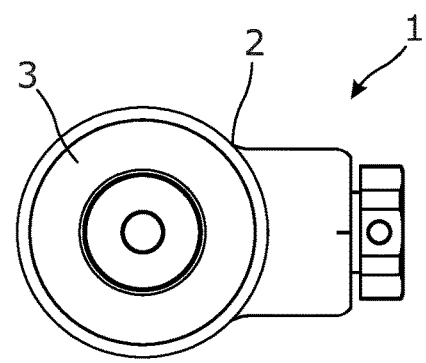
Figure 2:
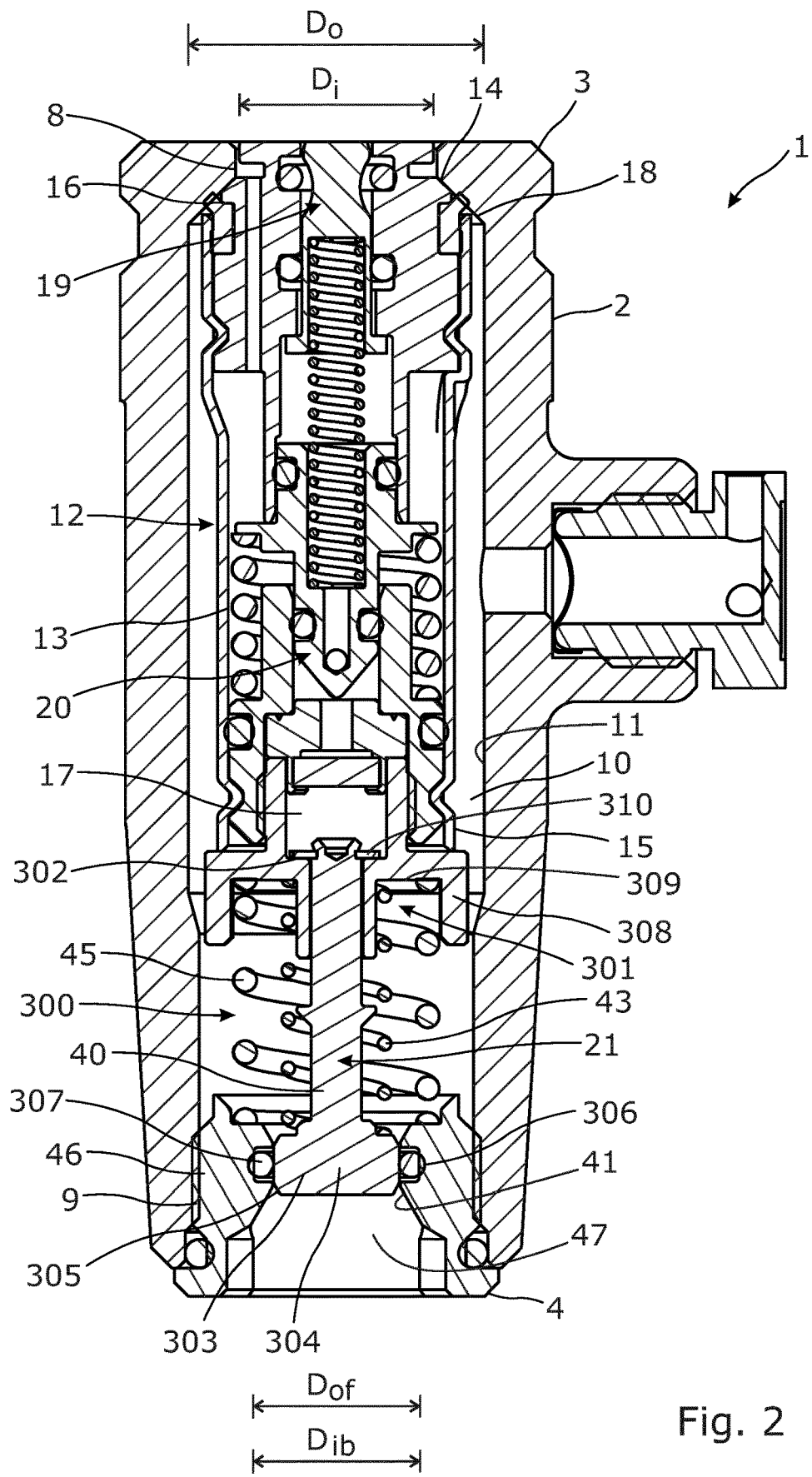
Figure 3:
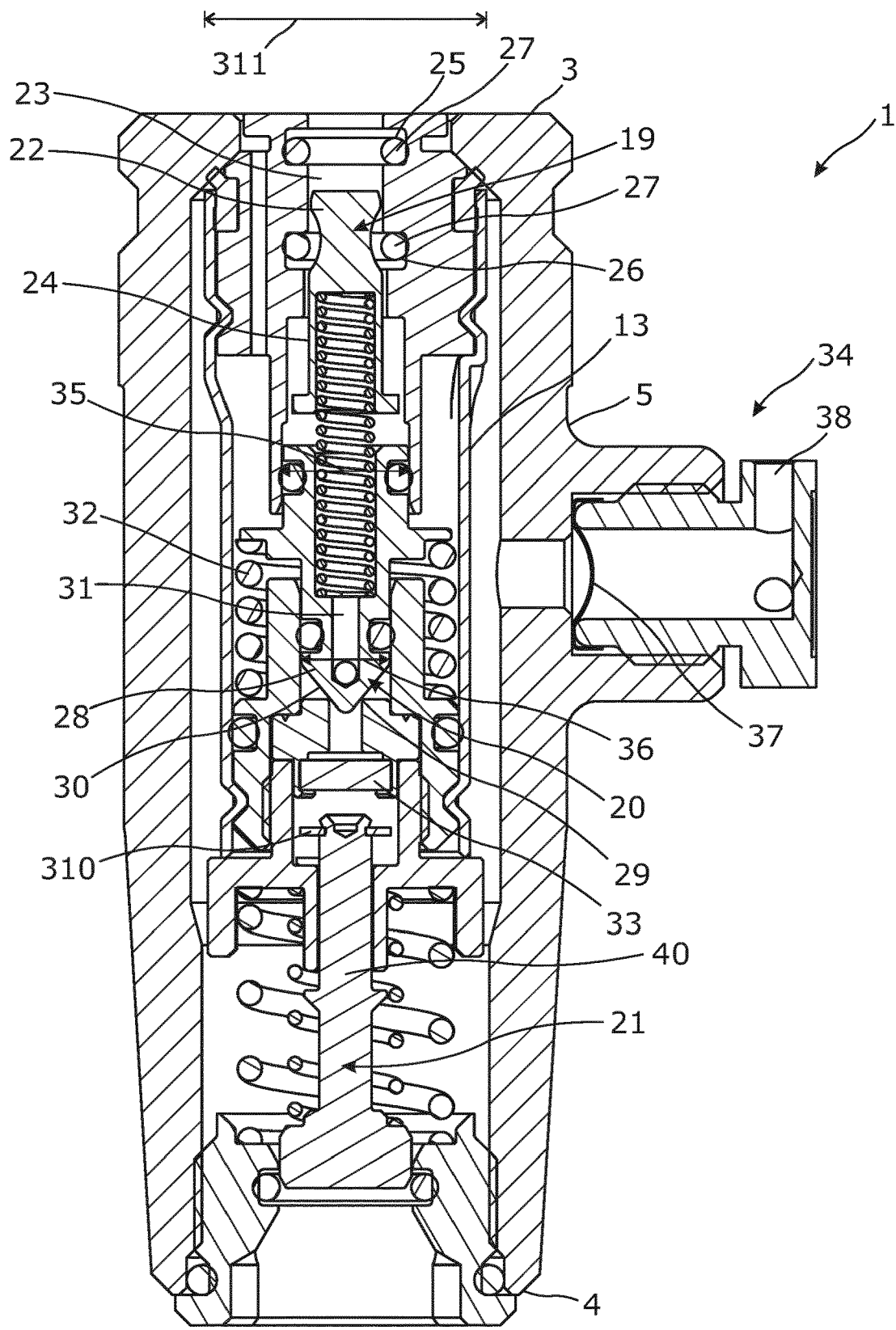
Figure 4:
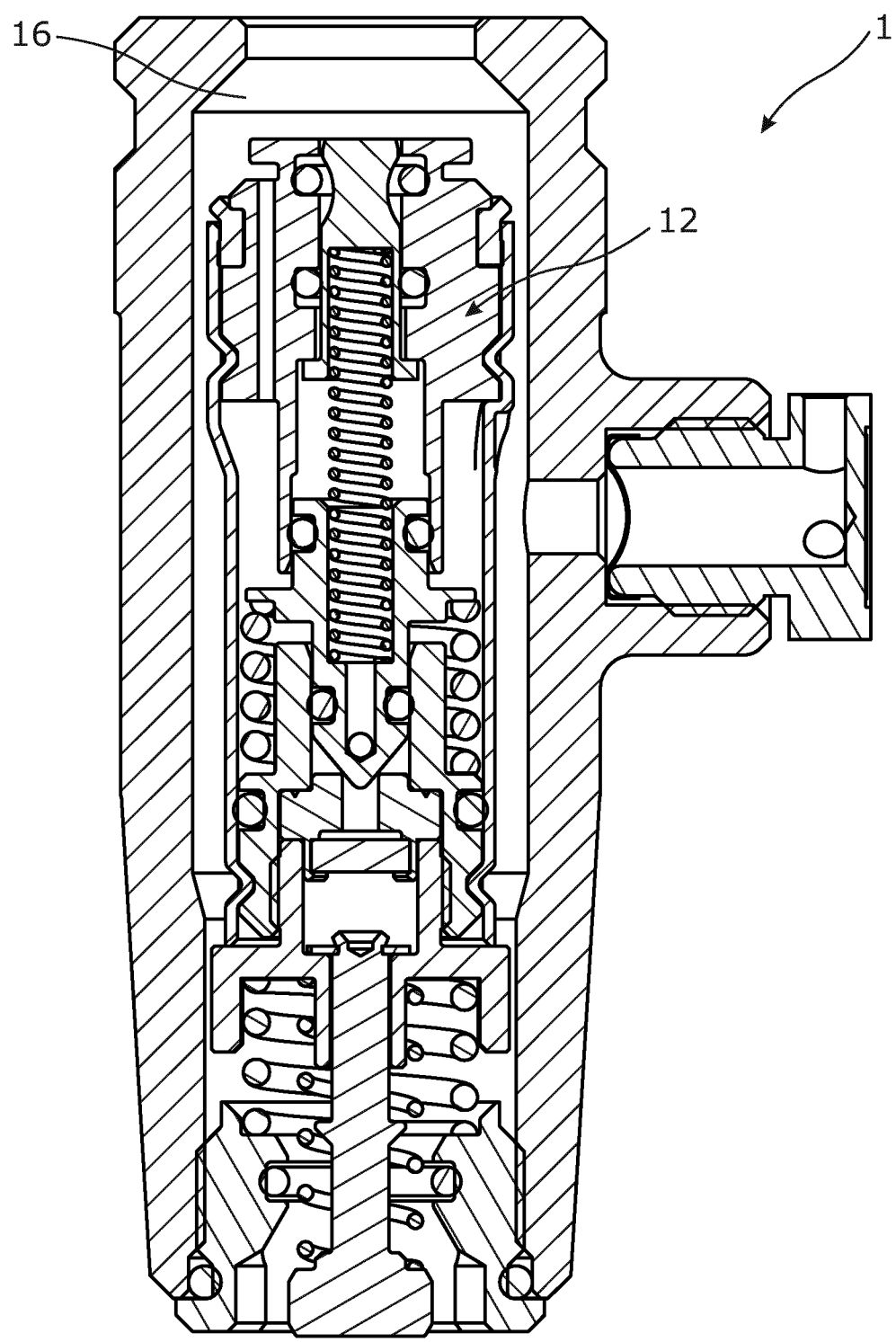
Figure 5:
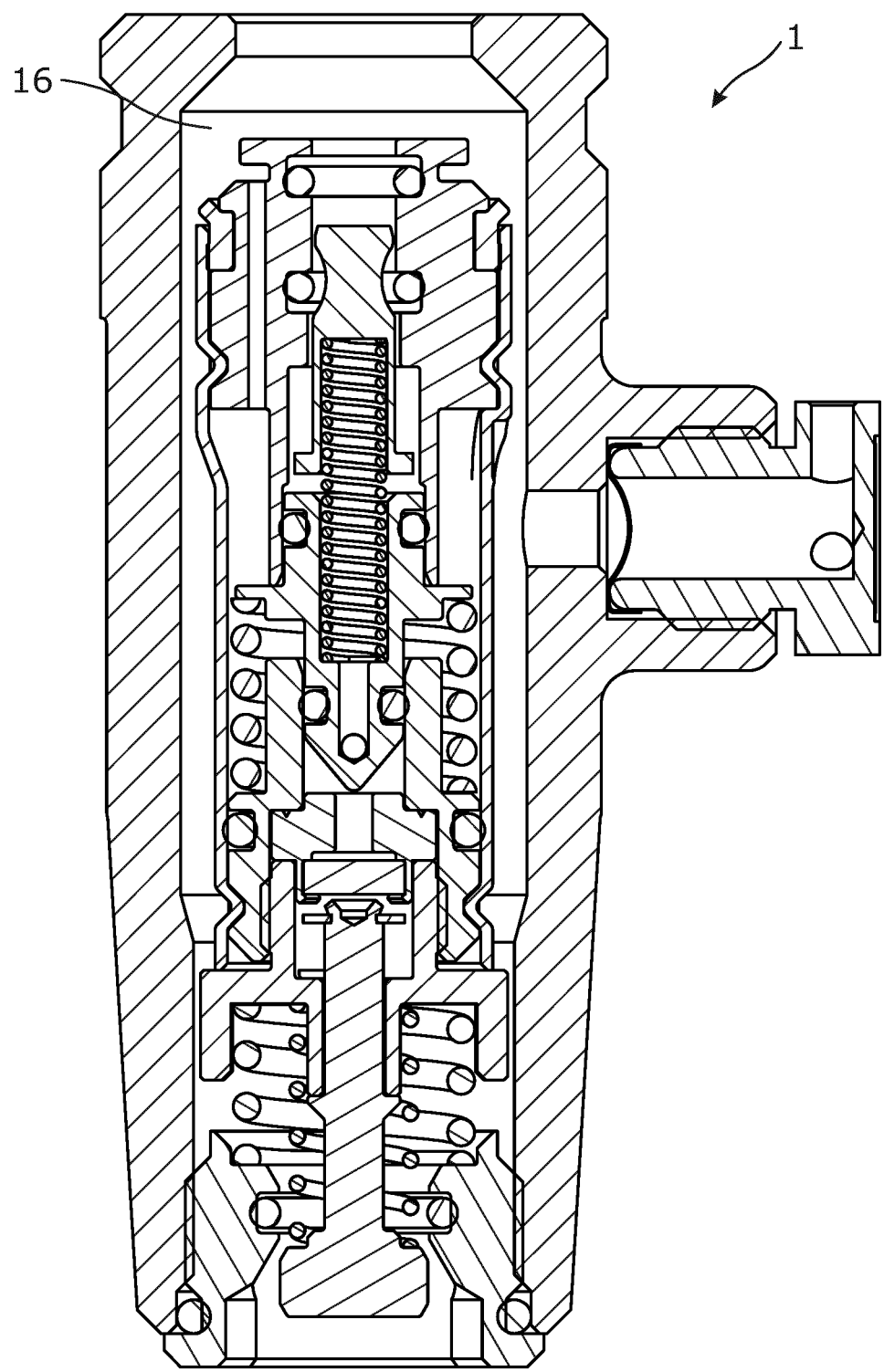
FIG. 5 shows the valve assembly in a position of the filling valve 16 wherein it is possible to provide a vacuum to the gas cylinder.
Figure 10:
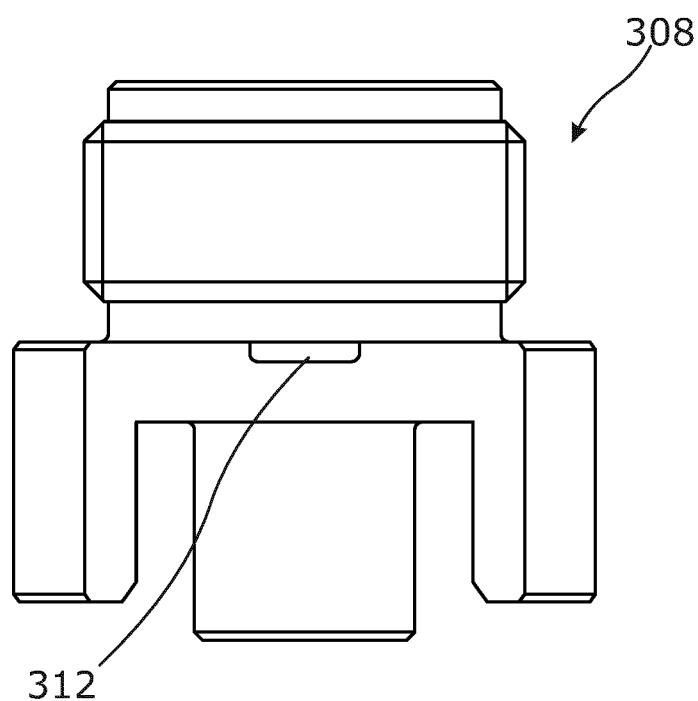
Figure 11:
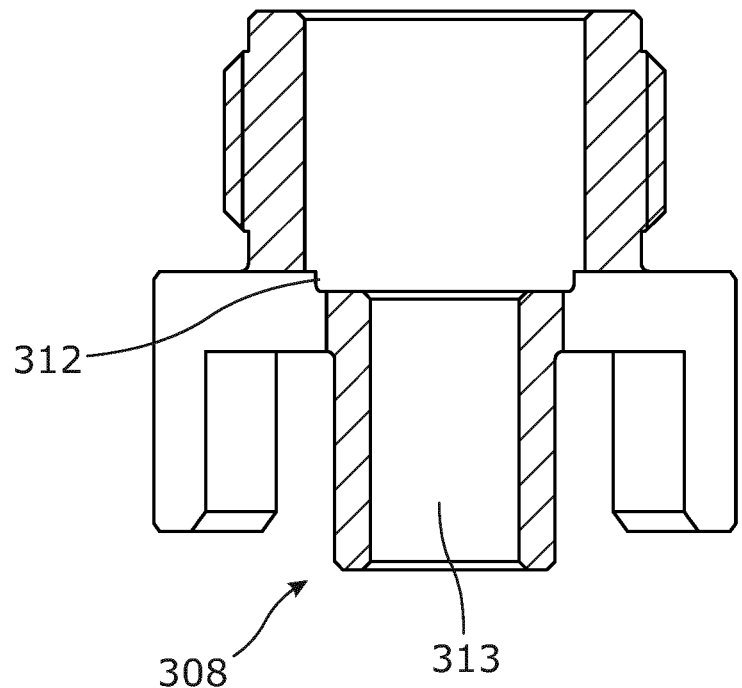
Figure 15:
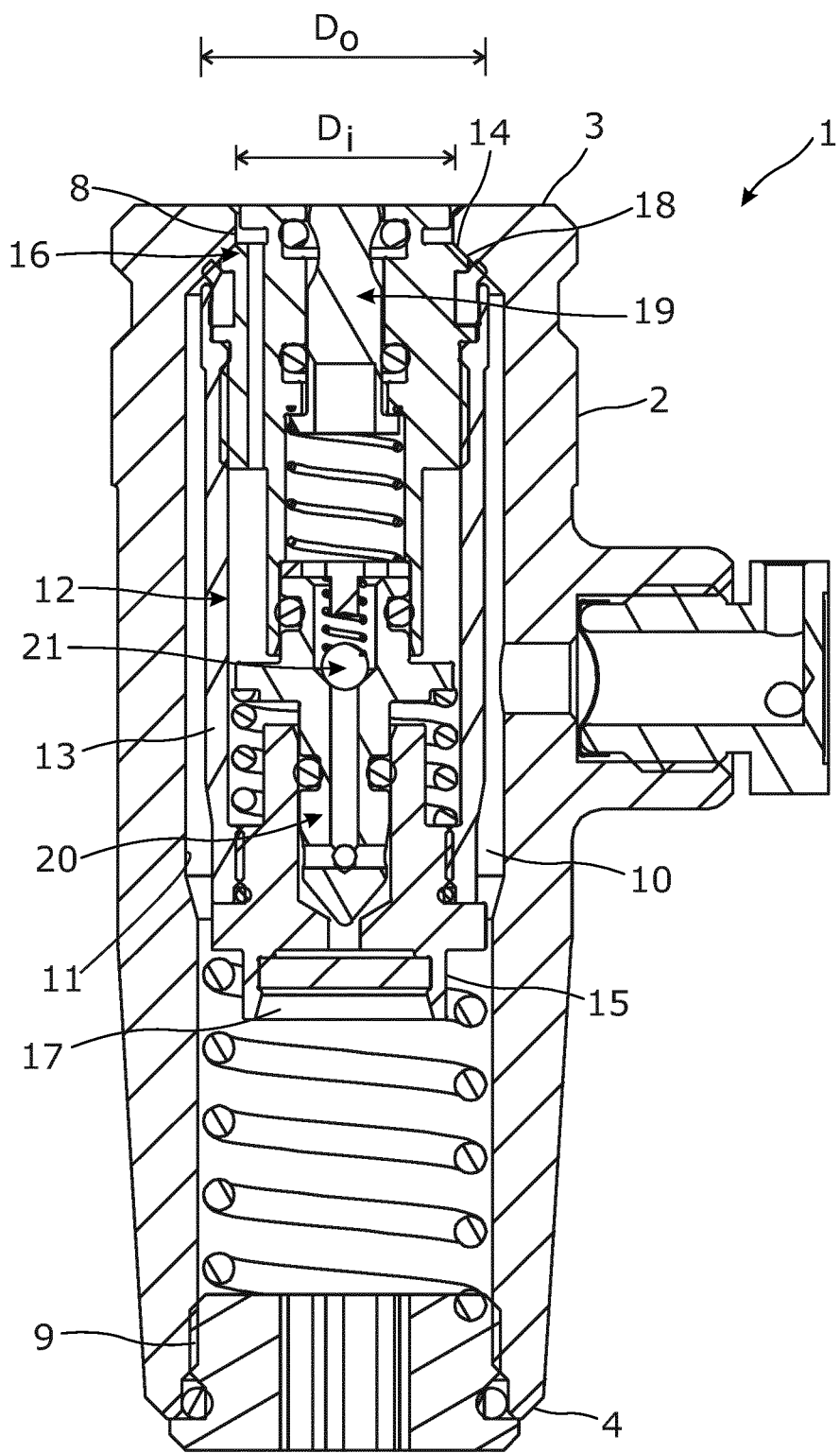

FIG. 15 shows a cross-sectional view of an embodiment of a valve assembly 1. The valve assembly 1 in FIG. 2 is in its closed position. The valve assembly 1 comprises the valve housing 2 having the first housing end 3 and a second housing end 4, a first housing opening 8 arranged at the first housing end 3 and a second housing opening 9 arranged at the second housing end 4, the first opening 8 having an inner diameter Di. The valve housing 2 further comprises a bore 10 extending between the first housing opening 8 and the second housing opening 9, the bore 10 having an inner face 11.

Furthermore, an inner valve unit 12 is arranged in the bore 10. The inner valve unit having an inner valve housing 13, a first end 14 and a second end 15. The first end 14 has an outer diameter Do, the outer diameter Do being larger than the inner diameter Di of the first opening 8, the first end 14 being configured to abut the inner face 11 at the first opening 8, whereby a filling valve 16 is provided. The second end of the inner valve unit 12 comprises an inlet 17 to the inner valve unit 12, the inner face 11 of the valve housing 2 at the first housing opening 8 being a filling valve seat 18.

The inner valve unit 12 further comprises a consumption valve 19 arranged at the first end 14, a first pressure reduction valve 20 configured to reduce a pressure in the gas cylinder from a first gas pressure to a second gas pressure, and a residue pressure valve 21.

The residue pressure valve 21 is arranged downstream of the first pressure reduction valve 20 in relation to the inlet 17. This will be further described in connection with FIG. 17.

Figure 16:
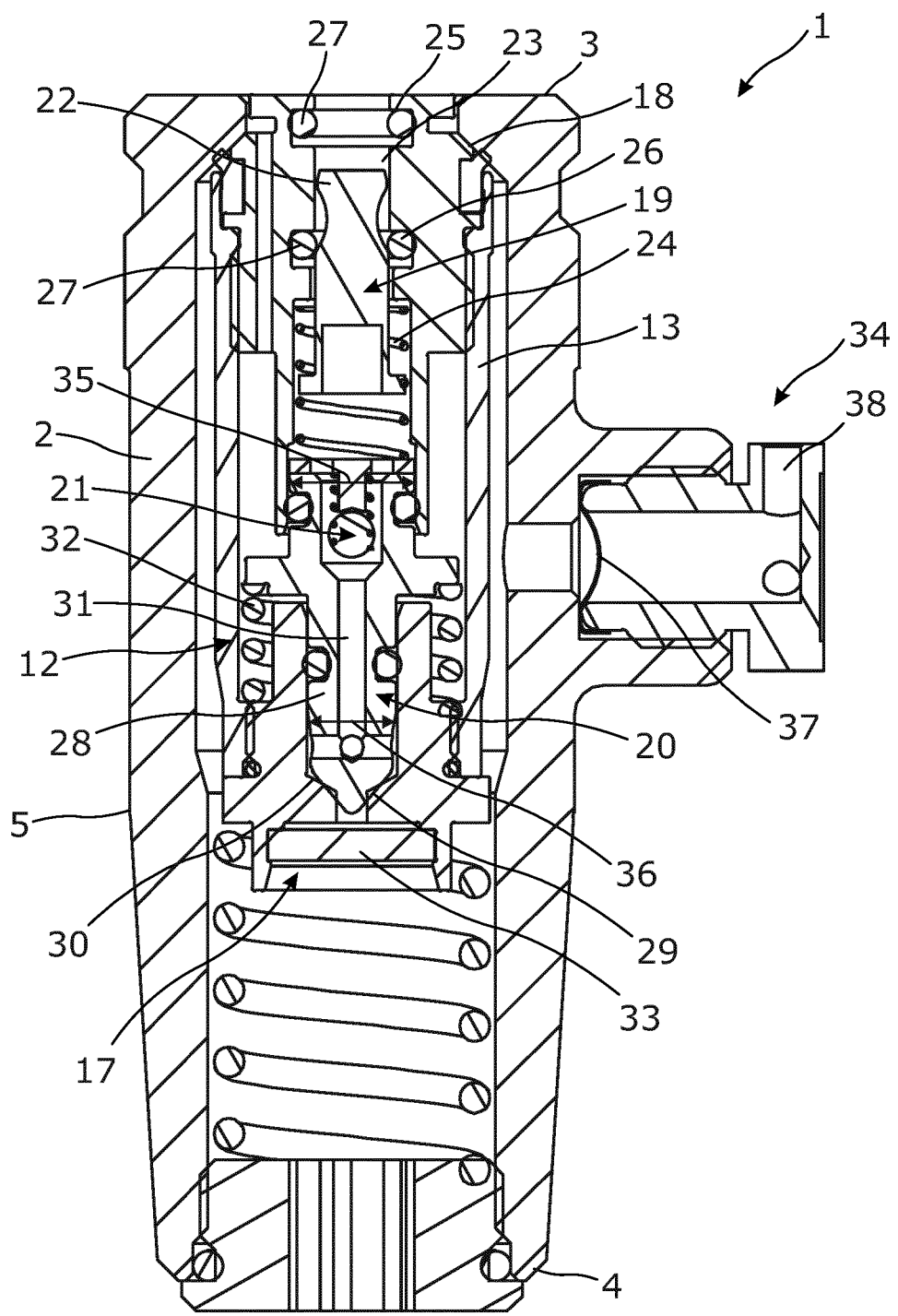

In FIG. 16, the valve assembly 1 is shown in a cross-sectional view. In FIG. 16, the consumption valve 19 has been activated so that it is open to deliver gas to the gas consuming system. The consumption valve 19 has been opened by an external pressure body (not shown). The consumption valve 19 comprises a closing member 22 arranged in an inner bore 23 of the inner valve housing 13. The consumption valve 19 has a consumption valve spring 24 forcing the closing member 22 upwards to the closed position of the consumption valve 19 (as shown in FIG. 15). The inner bore 23 has an upper groove 25 and a lower groove 26 arranged at a distance to each other. In the upper groove 25 and lower groove 26, sealing elements 27 are arranged. At least the sealing element 27 arranged in the lower groove 26 seals off around the closing member 22 when it is in the closed position. The closing member 22 has a narrowing area where the diameter of the closing member 22 is smaller than the rest of the closing member so that, in the open position as shown in FIG. 15, the gas may flow past the closing member 22 between the inner bore 23 and the closing member 22.

When the consumption valve 19 is to be opened, the external pressure body presses on the closing member 22 with a force greater than the force of the consumption valve spring 24 and the regulated pressure of the gas cylinder.

The first pressure reduction valve 20 is configured to reduce a pressure in the gas cylinder from a first gas pressure to a second gas pressure. The first pressure reduction valve 20 comprises a second closing part 28 configured to abut a pressure reduction valve seat 29. The second closing part 28 has a second abutment face 30, and the second abutment face 30 is made of a semi-rigid or rigid material. The second closing part 28 has a member bore 31 through which the gas may flow.

The reduction of pressure is provided by a first part area 35 arranged upstream of a second part area 36, the first part area 35 being larger than the second part area 36 seen in the flow direction of the gas. The first part area 35 and the second part area 36 are the cross-sectional areas in the flow direction of the gas.

The first pressure reduction valve 20 is configured to be kept open above a predetermined pressure level. The predetermined pressure level corresponds to the second gas pressure. Hence, when the first gas pressure, i.e. the gas pressure present in the gas cylinder, is equal to the second gas pressure, the first pressure reduction valve 20 does not reduce the gas pressure, and therefore it is kept open.

The predetermined pressure level may be between 25 and 45 bar, preferably around and above 35 bar.

The first pressure reduction valve 20 has a second spring 32 exerting a second predetermined pressure in the opposite direction of the pressure reduction valve seat 30, so that the second closing part 28 is configured to be away from the pressure reduction valve seat 30, when the gas pressure inside the gas cylinder is equal to or lower than the second predetermined pressure.

In FIG. 16, when the closing member 22 has been moved downwards and past the upper sealing element 27, so that the gas present in the gas cylinder having a first gas pressure may flow via a filter element 33 to the first pressure reduction valve 20. In the first pressure reduction valve 20, the second closing part 28 has been displaced slightly upwards, so that a gap exists between the pressure reduction valve seat 30 and the second closing part 28, whereby the gas may flow though this gap and into the member bore 31. The first gas pressure is reduced accordingly to a second gas pressure as described above. The gas with the second gas pressure then flows up and past the residue pressure valve 21 and further up and past the closing member 22 on its outside, and from there further into the consuming system (not shown).

The filter element 33 is arranged at the inlet 17 to the inner valve unit 12 for filtering the gas before it enters the inner valve unit 12.

The valve assembly 1 also comprises a pressure relief valve 34 arranged between the first housing end 3 and the second housing end 4. The pressure relief valve 34 is projecting radially out from the outer face 5 of the valve housing 2. The pressure relief valve 34 comprises a burst disc 37 which is set to burst at a predetermined pressure. In addition, the pressure relief valve 34 comprises one or more outlets for letting the gas out into the surroundings after the burst disc 37 has burst. Preferably the outlets are in the axial direction of the valve assembly 1, so that it is avoided that the gas cylinder is over-turned when the gas relieves via the pressure relief valve 34.

The residue pressure valve 21 is open in FIG. 16.

Figure 17:
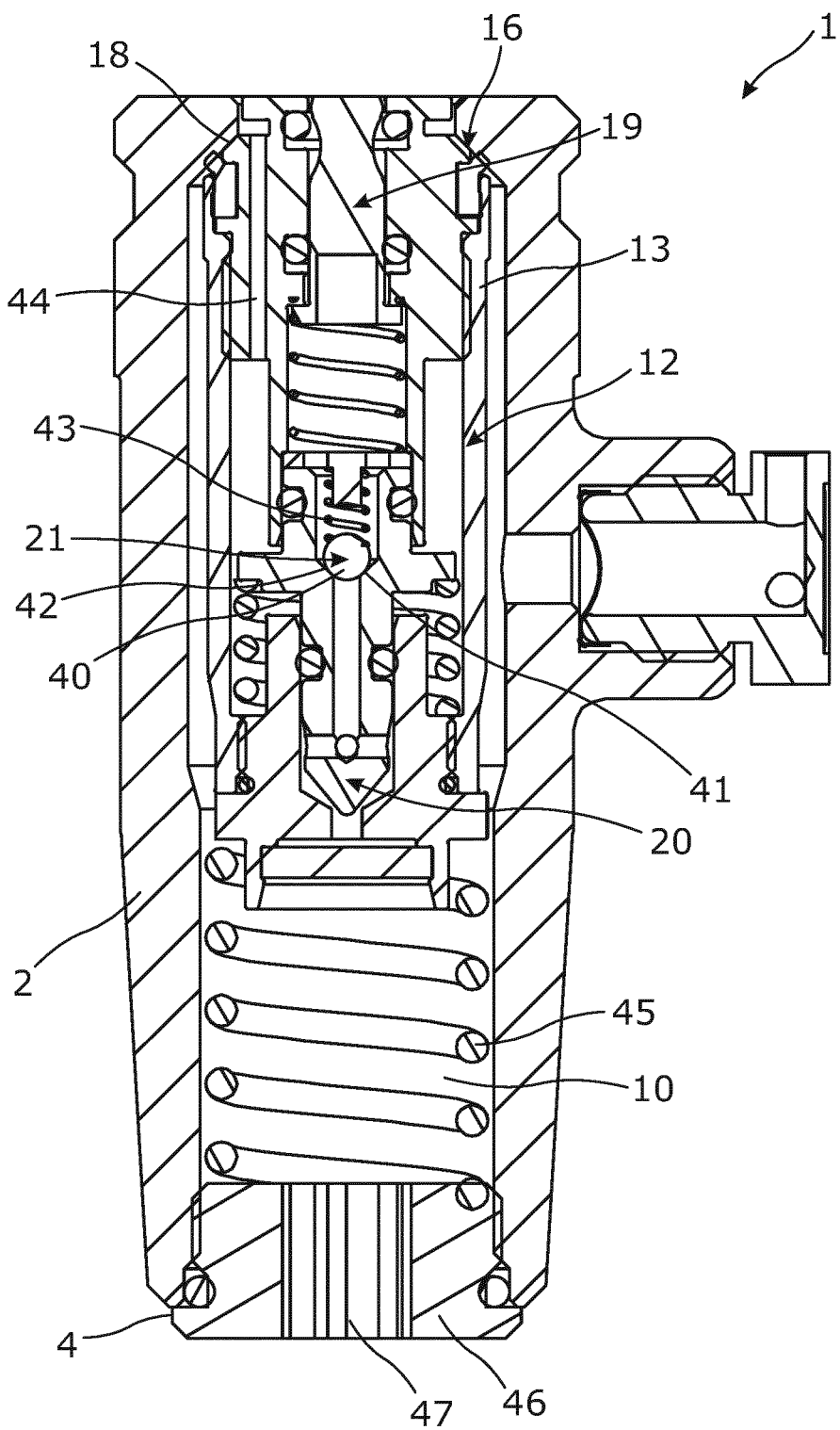

In FIG. 17, the valve assembly 1 is in the position in which the consumption valve 19 is closed and the first reduction valve 20 is open. The residue pressure valve 21 is closed.

The residue pressure valve 21 comprises a first closing part 40 configured to abut a residue pressure valve seat 41, the first closing part 40 having a first abutment face 42, the first abutment face being made of a semi-rigid or soft material. In the present embodiment, the first closing part 40 is a ball. However, it may have other designs such torpedo-shaped, conical-shaped or similar shapes.

The residue pressure valve 21 has a first spring 43 exerting a first predetermined spring force on the first closing part 40, so that the first closing part 40 is configured to abut the residue pressure valve seat 41 when the pressure inside the gas cylinder is lower than the first predetermined spring force.

The first predetermined spring force may be between 2 and 8 bar, preferably between 3 and 5 bar.

Hereby it is obtained that the gas cylinder is protected when the gas pressure present in the gas cylinder drops below a predetermined level. When the pressure present in the gas cylinder is lower than the spring force of the first spring 43, the first closing part 40 will be pressed downwards against the residue pressure valve seat 41, so that the residual pressure in the gas cylinder is maintained, whereby it is obtained that the gas cylinder is protected.

By positioning the residue pressure valve 21 downstream of the first pressure reduction valve 20 it is obtained that the residue pressure valve 21 operates in lower pressure conditions, whereby the residue pressure valve 21 is not exposed to high pressures affecting the first closing part in particular. The function of the residue pressure valve 21 is then more stable resulting in the advantage that the gas cylinder is better protected than the prior art solutions. In addition, the first closing part itself or the first abutment face may be made of a semi-rigid or soft material, so that the closure between the first closing part and the residue pressure valve seat is enhanced.

Moreover, the residue pressure valve seat may be made of a semi-rigid or soft material for enhancing the closure between the residue pressure valve seat and the first closing part.

Furthermore, a venting channel 44 is arranged in the inner valve unit 12, the venting channel 44 being configured to vent an inside of the inner valve unit 12.

The inner valve housing 13 is a third closing part of the filling valve 16, a third spring 45 being arranged in the bore 10, so that the inner valve housing 13 is forced against the filling valve seat 18.

A plug 46 is arranged in the bore 10 at the second housing end 4, the plug 46 having an aperture 47 allowing gas to flow into the valve assembly 1. The plug 46 functions as support for the third spring 45. The plug 46 may have a threaded area which may be screwed into a similar threaded area of the inner face of the valve housing 2.

Figure 18:
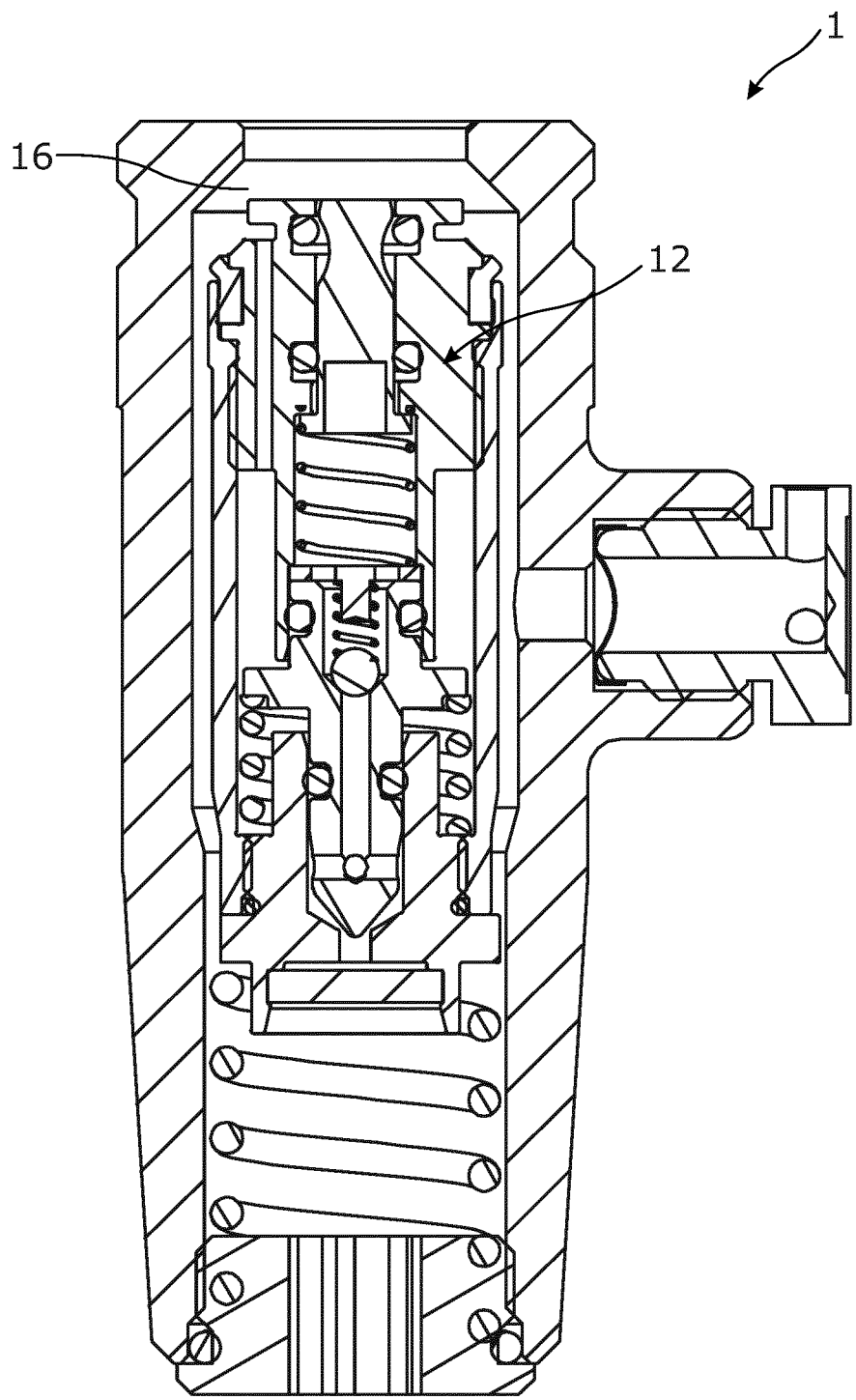

FIG. 18 shows the valve assembly 1 in a position in which the filling valve 16 is open. The filling valve is arranged concentrically around the inner valve unit 12. The filling valve 16 has been opened by a gas filling device which is configured to be connected with the valve assembly 1. The gas filling device will be described further below. When the filling valve 16 is open, the gas cylinder may be filled with gas by by-passing the inner valve unit 12. Furthermore, by means of the filling valve it is possible to provide a vacuum to the gas cylinder.

Figure 19A:
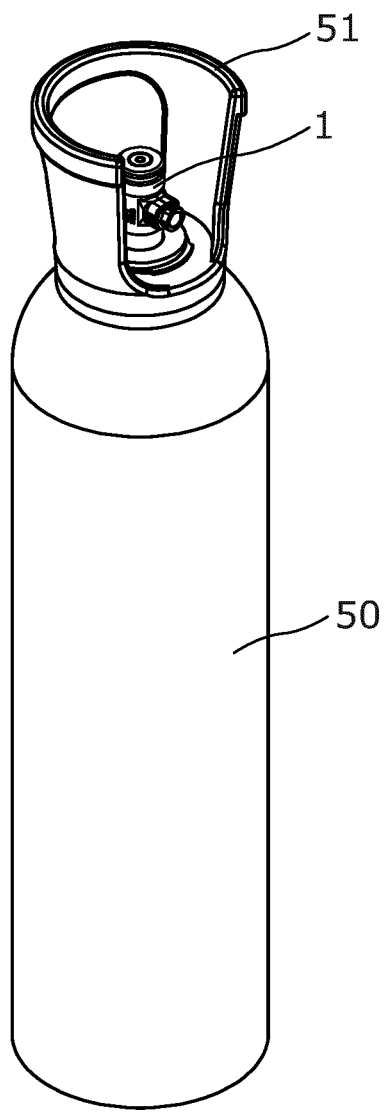
Figure 19B:
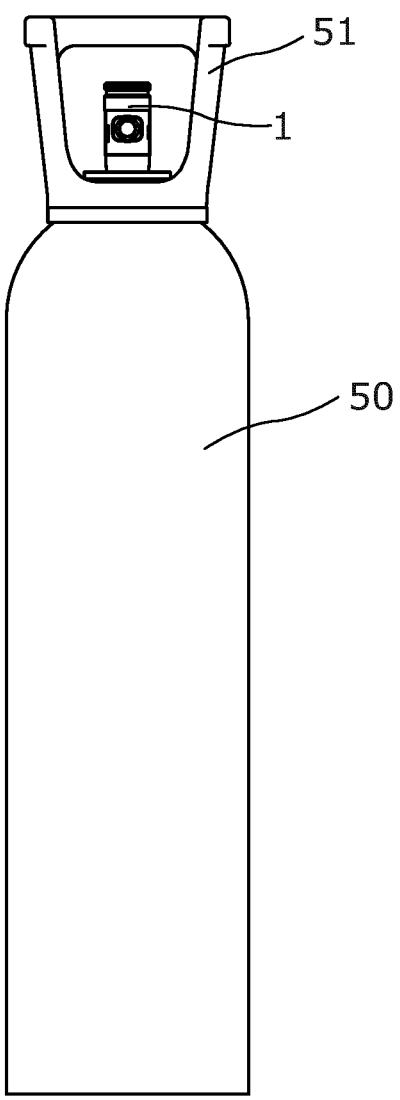
Figure 19C:
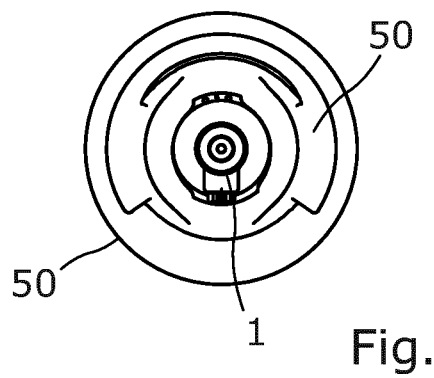

FIGS. 19a-19c show a gas cylinder 50 having a gas with a pressure and a cylinder opening. The valve assembly 1 is arranged in the cylinder opening. Around the valve assembly 1, an embodiment of a shield 51 is arranged for protecting the valve assembly 1 against damage. In the embodiments shown, the consumption valve of the valve assembly 1 is arranged axially in relation to the cylinder opening of the gas cylinder 50. However, in other not shown embodiments, the consumption valve of the valve assembly may be arranged radially in relation to the cylinder opening of the gas cylinder 50.

Furthermore, a protective cap (not shown) may be arranged on the valve assembly to protect the valve assembly during transportation and storage. The cap may be configured to be arranged above the valve assembly. Preferably, the cap is made of a rigid material, such as metal, composite or rigid plastic material. The cap may have an opening in the centre enabling the external pressure body (not shown) to project through the opening and displace the first closing part of the consumption valve. Furthermore, the cap may be configured to prevent unintended activation and opening of the gas filling valve.

Figure 20A:
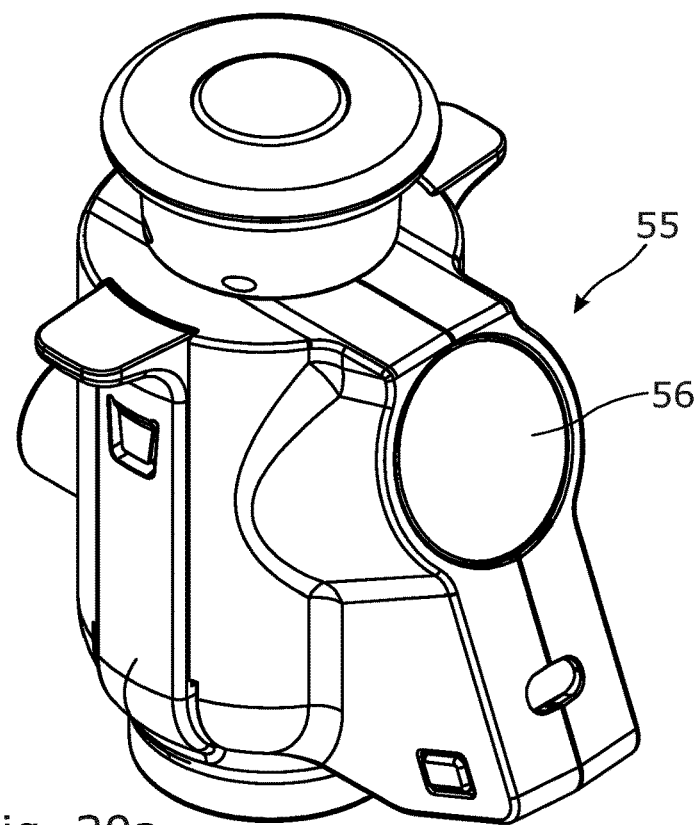
Figure 20B:
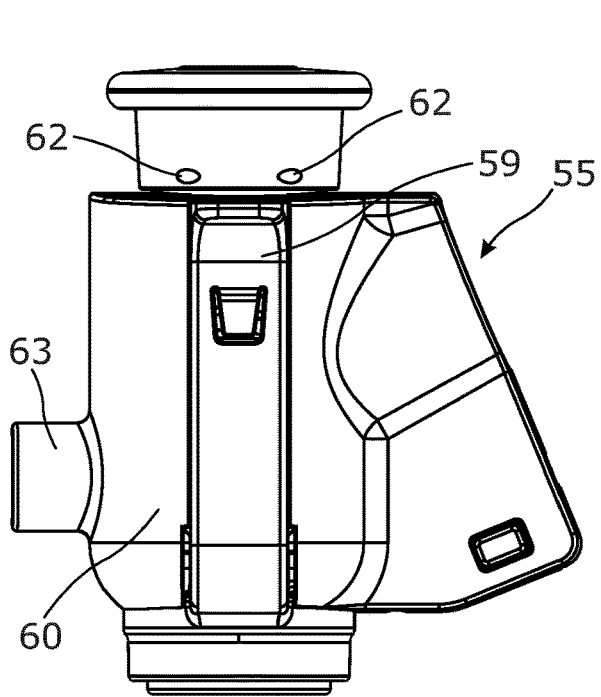
Figure 20C:
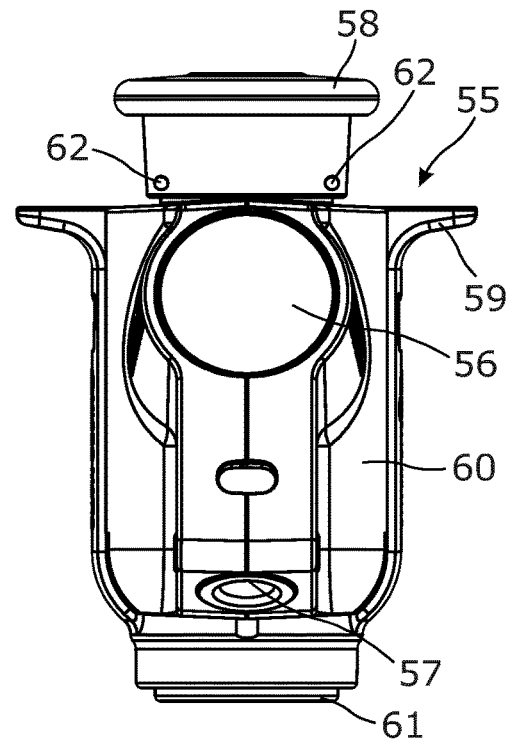
Figure 20D:
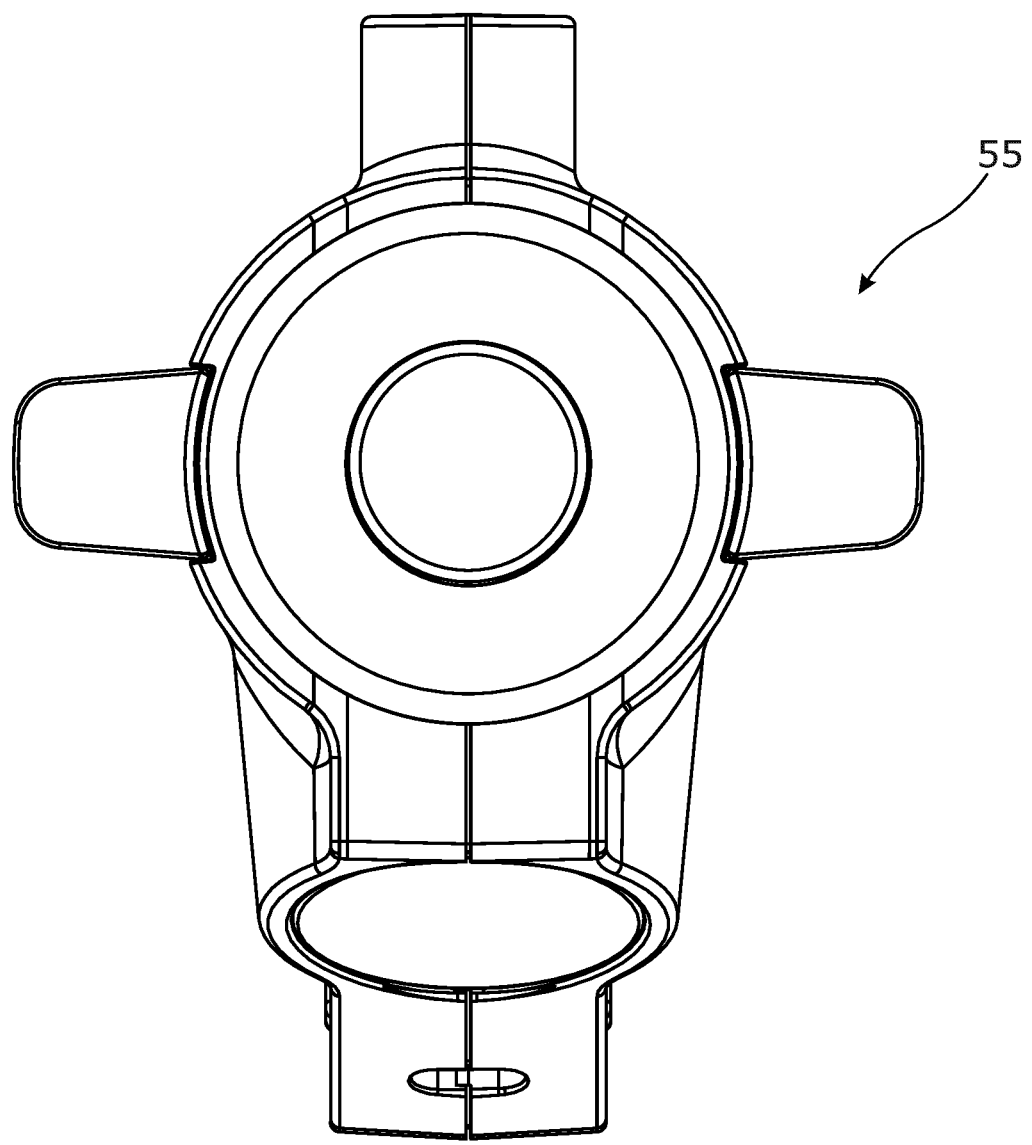

FIGS. 20a-20d show a gas pressure regulation device 55. The gas pressure regulation device 55 is configured to be connected with the first housing end of the valve housing of the valve assembly. FIG. 20c shows the gas pressure regulation device 55 in a front view. The gas pressure regulation device 55 comprises a pressure indicator 56, a handle 58 for regulating the pressure for the gas flowing through the gas pressure regulation device 55 and a device outlet 57. The gas pressure regulation device 55 also comprises a connection handle 59. The connection handle 59 has two flanges projecting out from the device housing 60. The gas pressure regulation device 55 is configured to be connected with a valve assembly, as described above, or an adaptor unit, at a first device end 61. The handle 58 comprises a plurality of holes 62 configured to receive a tamper-evident strip (not shown) which will be described further below. FIG. 20b shows the gas pressure regulation device 55 in a side view. The connection handle 59 extends downwards on the outside of the housing 60. The gas pressure regulation device 55 also comprises a pressure relief device valve 63. FIG. 20d shows the gas pressure regulation device 55 in a top view. FIG. 20a shows the gas pressure regulation device 55 in a perspective view.

Figure 21:
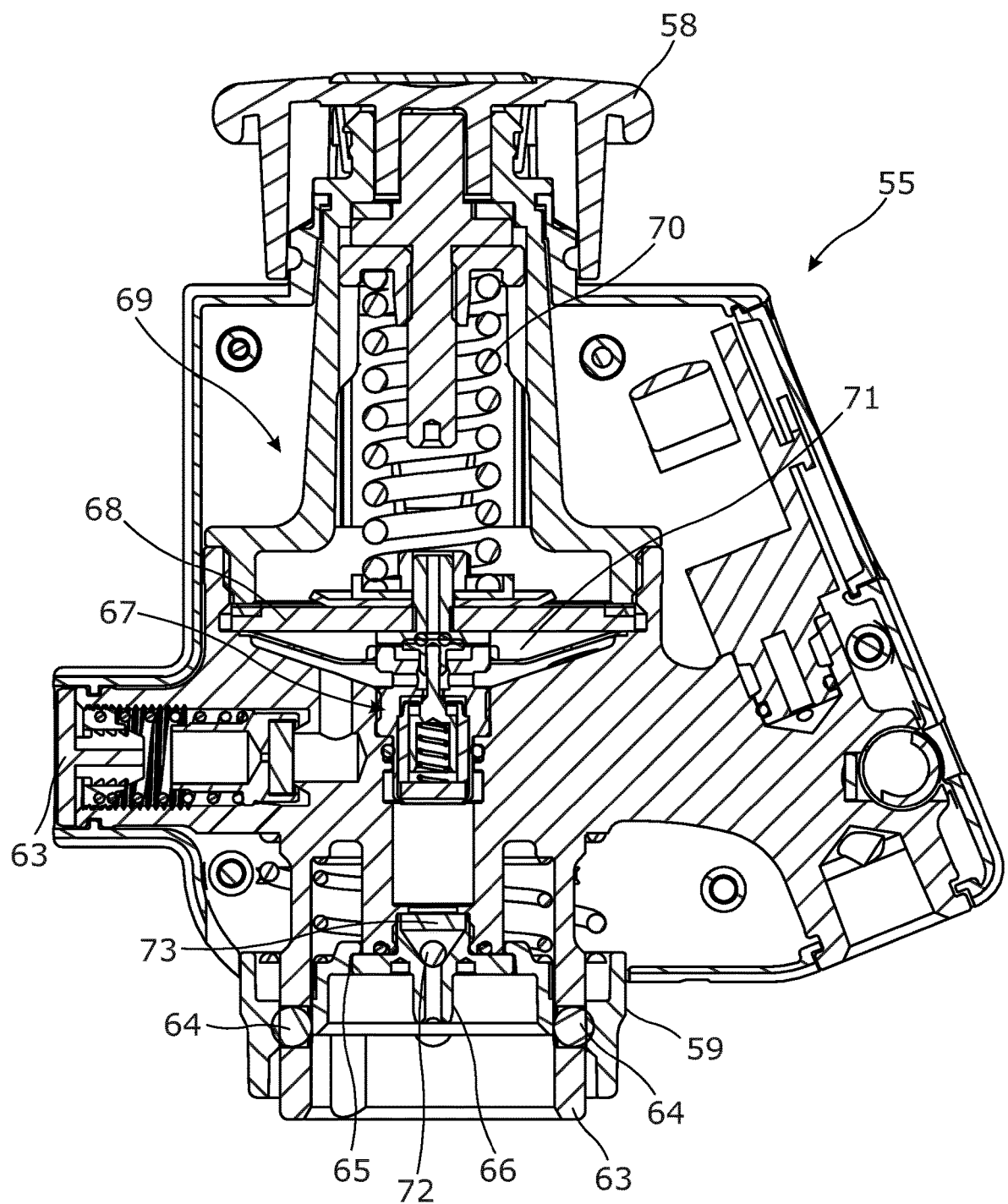

In FIG. 21, the gas pressure regulation device 55 of FIGS. 20a-20d is shown in a first cross-sectional view. The first cross-sectional view is taken along the centre line of the gas pressure regulation device 55. The gas pressure regulation device 55 is configured to be connected with the valve assembly described above and comprises a collar 63 configured to engage the first housing end of the valve assembly. In a groove in the collar 63, balls 64 are arranged. The balls 64 are configured to be displaced radially inwards when the connection handle 59 is pressed downwards, so that the balls may engage the groove of the valve assembly, whereby a mechanical locking between the valve assembly and the gas pressure regulation device 55 is obtained. Furthermore, the gas pressure regulation device 55 also comprises a spring-loaded inner ring 65, which is configured to maintain the balls 64 within the grooves in a not-engaging position, in the deactivated position.

The gas pressure regulation device 55 furthermore comprises an external pressure body 66 configured to be displaced downwards to open the consumption valve of the valve assembly.

The gas pressure regulation device 55 also comprises a second pressure reduction valve 67. A diaphragm 68 is connected with a regulator unit 69, here in the form of a regulator spring 70, and the regulator unit 69 is connected with the handle 58. As pressure in an upper chamber 71 increases, the diaphragm 68 is pushed upwards, causing the second pressure reduction valve to reduce flow, which brings the pressure back down. By adjusting the handle 58, the downward pressure on the diaphragm 68 can be increased, requiring more pressure in the upper chamber 71 in order to maintain equilibrium. In this way, an outlet pressure of the gas pressure regulation device 55 is controlled to the predetermined level.

A non-return valve in the form of a ball 72 is furthermore arranged downstream of the external pressure body 66, and a second filter element 73 is arranged downstream of the ball 72. The gas pressure regulation device 55 also comprises a pressure relief device valve 63, which is well-known and which will therefore not be described in detail.

Figure 22:
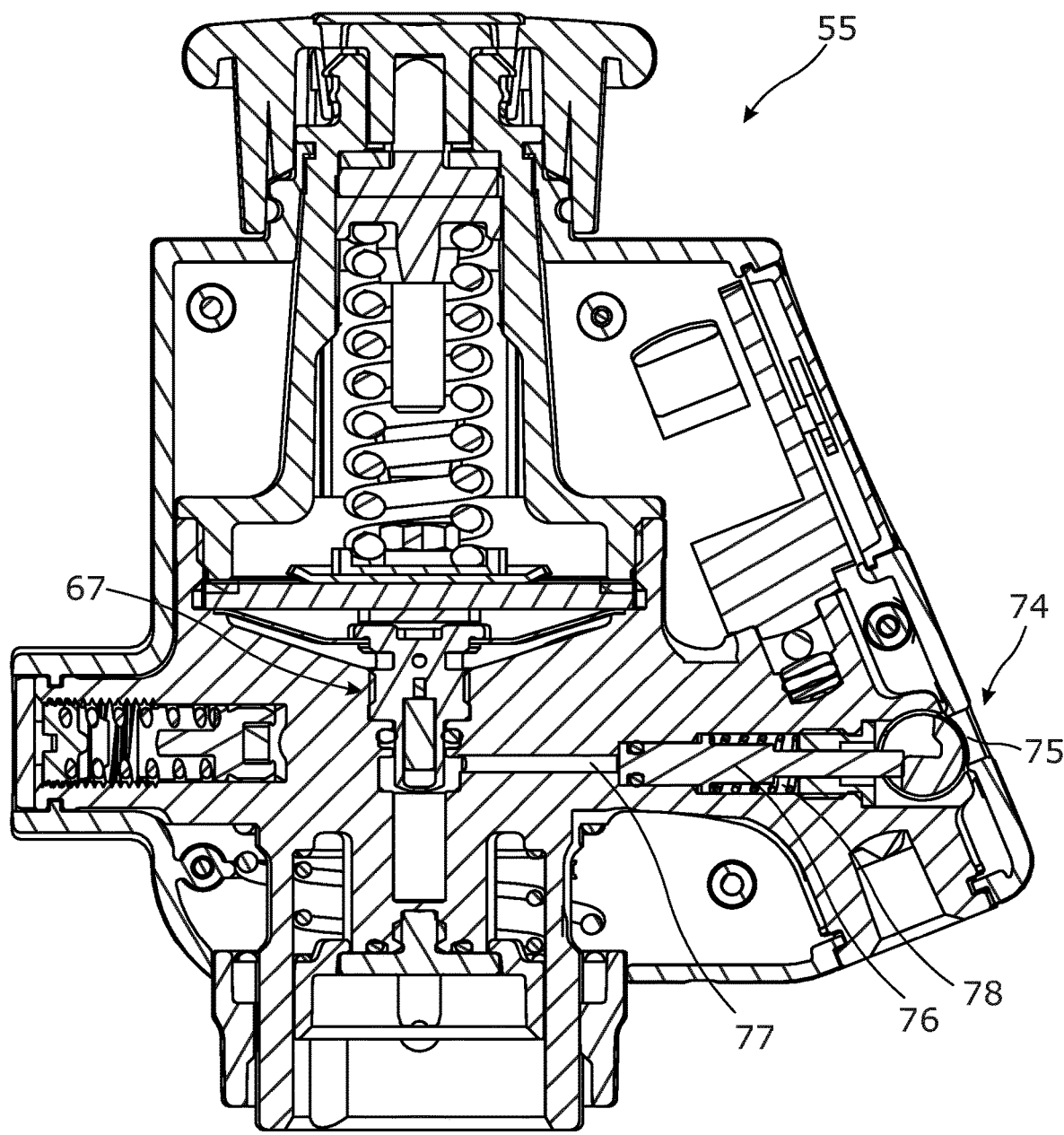

In FIG. 22, the gas pressure regulation device 55 is shown in a second cross-sectional view at the pressure indicator. The pressure indicator 74 is arranged in connection with the second pressure reduction valve 67. The pressure indicator 74 comprises a reading scale 75 and a piston 76 which counterbalances the pressure of the gas flowing in device bore 77 by a device spring 78. The piston 76 is configured to change the reading scale 75 for instance from one colour to another. These colours could be red and green, respectively. One purpose of the pressure indicator 74 is to indicate when the pressure in the gas cylinder is below a predetermined pressure level, indicating that the gas cylinder needs to be replaced.

Figure 23:
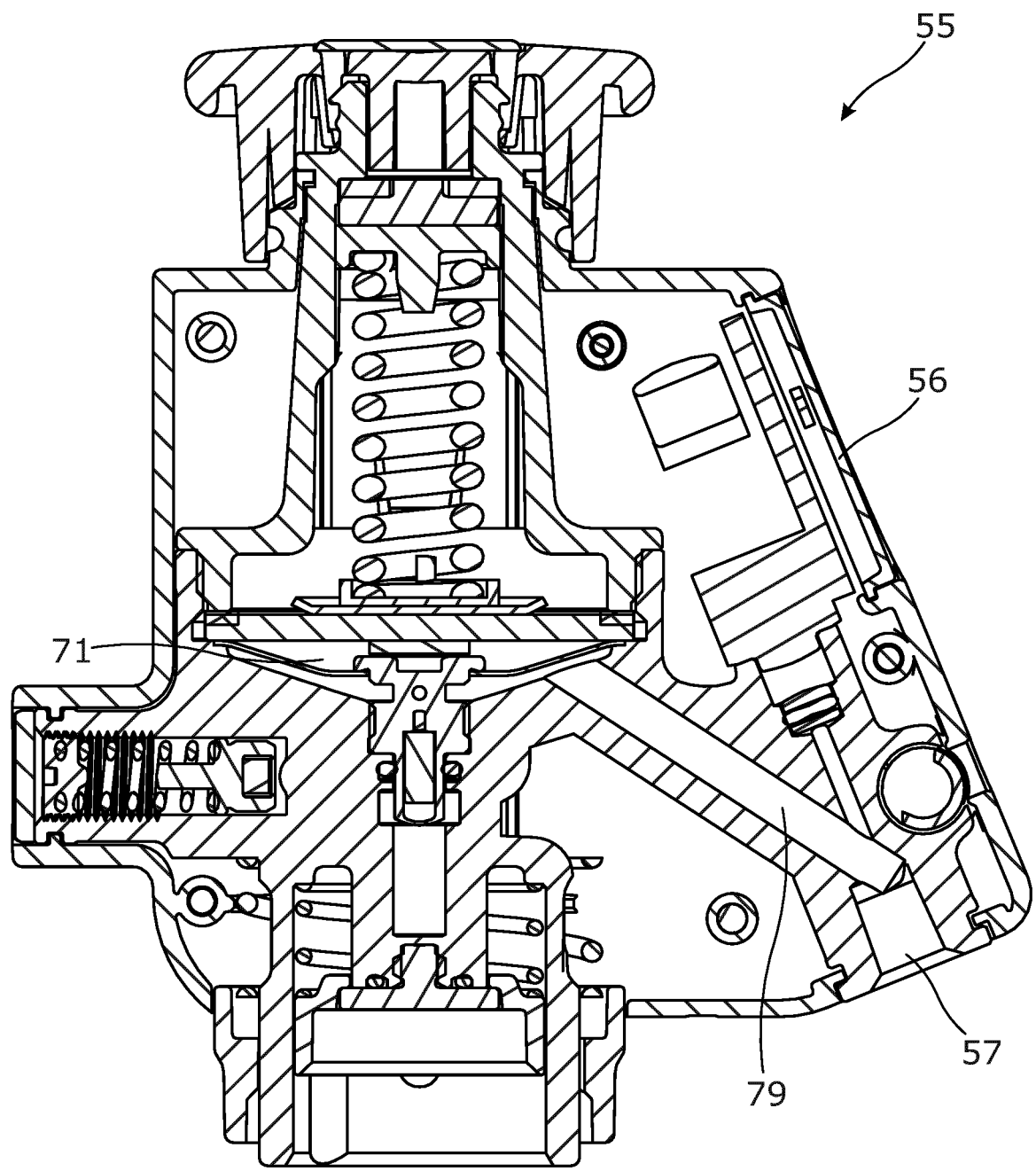

In FIG. 23, the gas pressure regulation device 55 is shown in a third cross-sectional view taken at the outlet 57. The outlet 57 is connected to the upper chamber 71 via an outlet bore 79. Furthermore, an additional pressure indicator 56 in the form of a manometer is arranged in connection with the outlet 57 so that the gas pressure leaving the outlet 57 may be read on the manometer.

Figure 24:
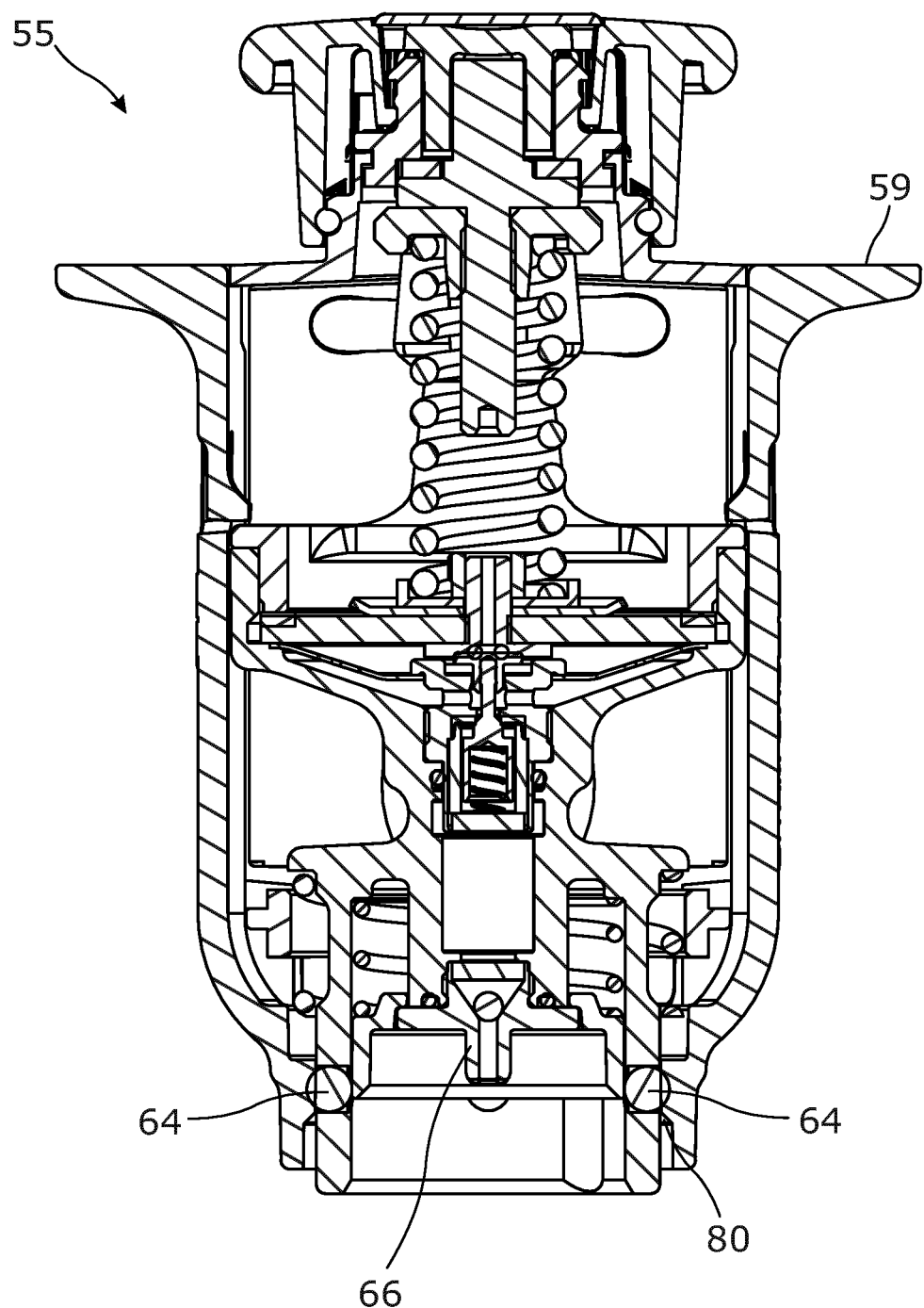

In FIG. 24, the gas pressure regulation device 55 is shown in a first cross-sectional view wherein the gas pressure regulation device 55 is activated by the connection handle 59 being pressed downwards. When the connection handle 59 is displaced downwards, a projection 80 ensures that the balls 64 are displaced radially inwards, and that they are maintained in these positions as long as the connection handle 59 is in its lowermost position. Hereby the gas pressure regulation device 55 is securely connected with a valve assembly as described above since the balls 64 project and engage the groove of the second housing end of the valve assembly (not shown). The external pressure body 66 has also been activated and displaced downwards for opening the consumption valve (not shown).

Figure 25A:
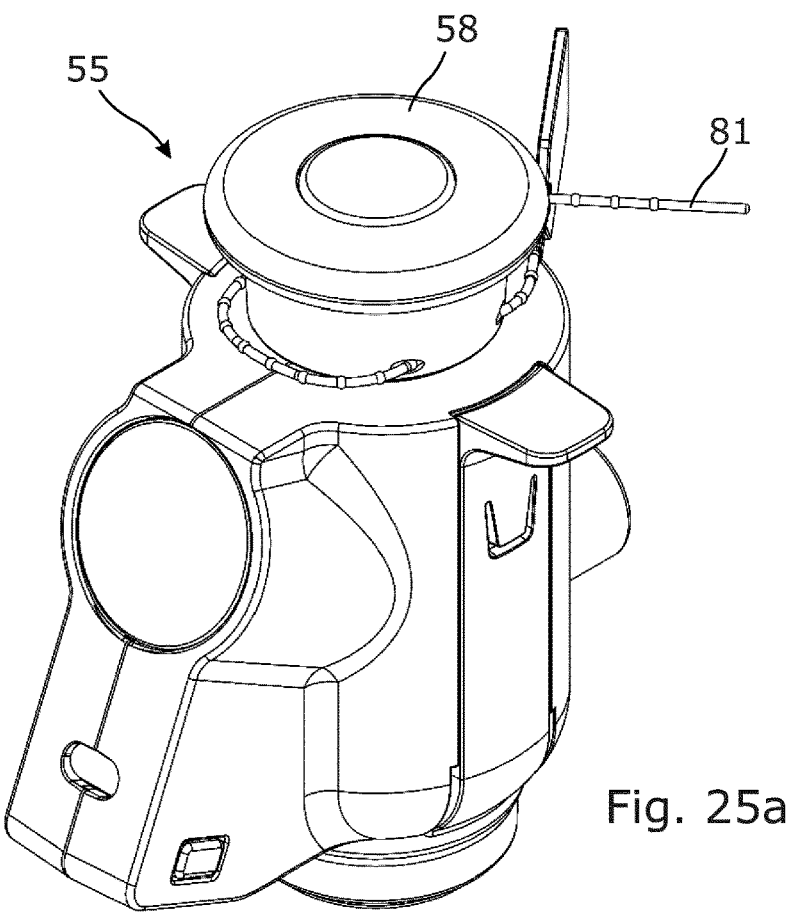
Figure 25B:
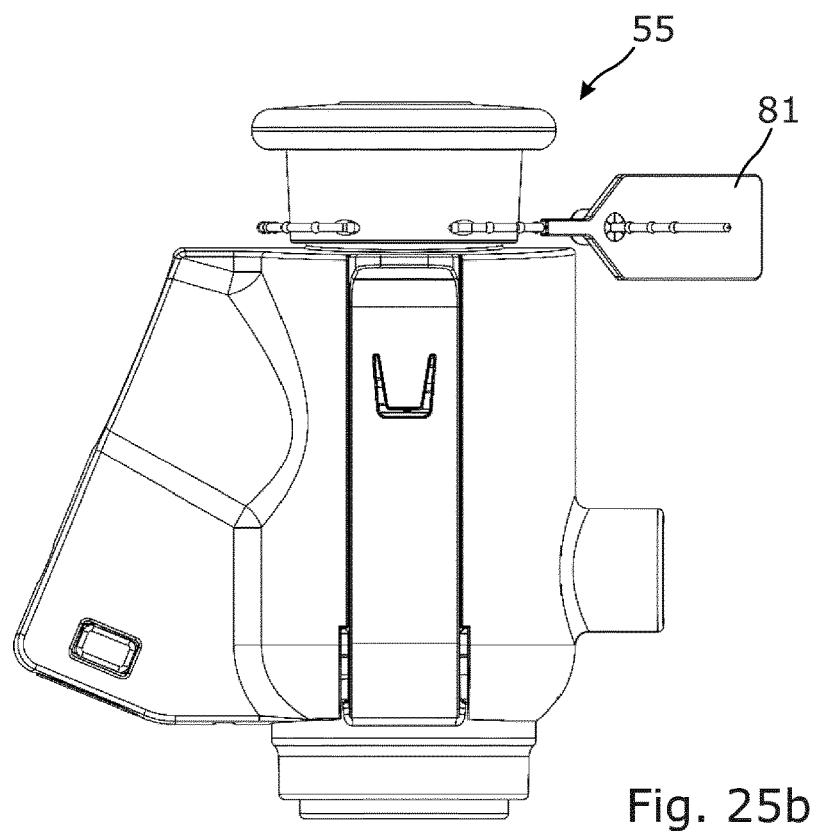

FIGS. 25a-25b show the gas pressure regulation device 55, wherein a tamper-evident strip 81 is inserted through the holes in the handle 58. The tamper-evident strip 81 ensures that the handle 58 cannot be activated before the tamper-evident strip 81 is removed from the handle 58. Thus the pressure regulation may be set to a predetermined level intended for the gas consuming system, and it is ensured that unintended regulation of the handle 58 is avoided by inserting the tamper-evident strip 81 into the holes.

Figure 25C:
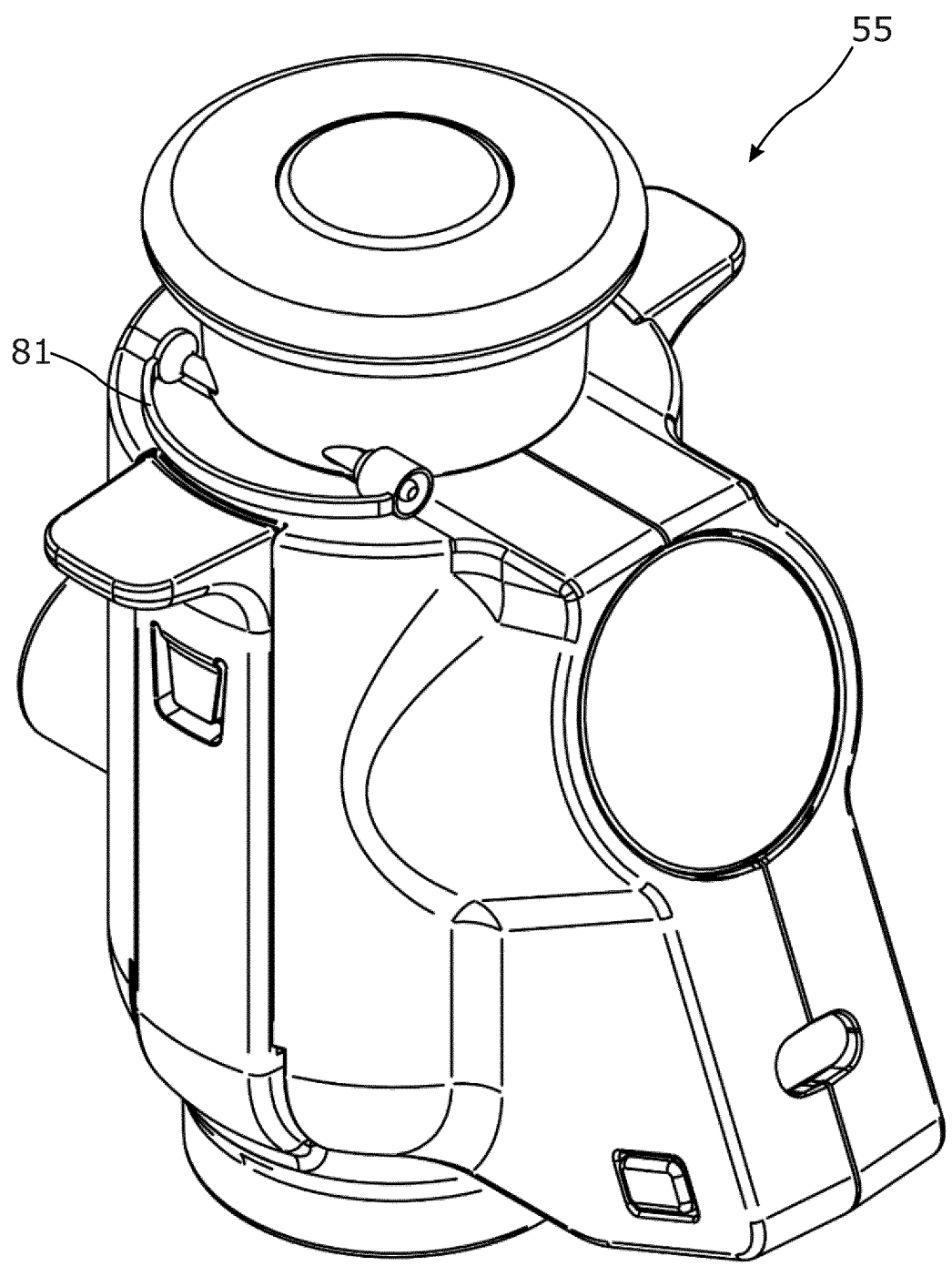

FIG. 25c shows the gas pressure regulation device 55, wherein another design of a tamper-evident strip 81 is inserted through the holes in the handle. The tamper-evident strip 81 ensures that the handle cannot be activated before the tamper-evident strip 81 is removed from the handle.

Thus, the pressure regulation may be set to a predetermined level intended for the gas consuming system, and it is ensured that unintended regulation of the handle is avoided by inserting the tamper-evident strip 81 into the holes.

In another embodiment (not shown), one or more pins are inserted into the holes in the handle in order to ensure that the handle is disabled for activation until the pins are removed from the holes.

FIGS. 26a-26b show the gas pressure regulation device 55 connected with the valve assembly 1 being arranged in the gas cylinder 50.

Figure 27:
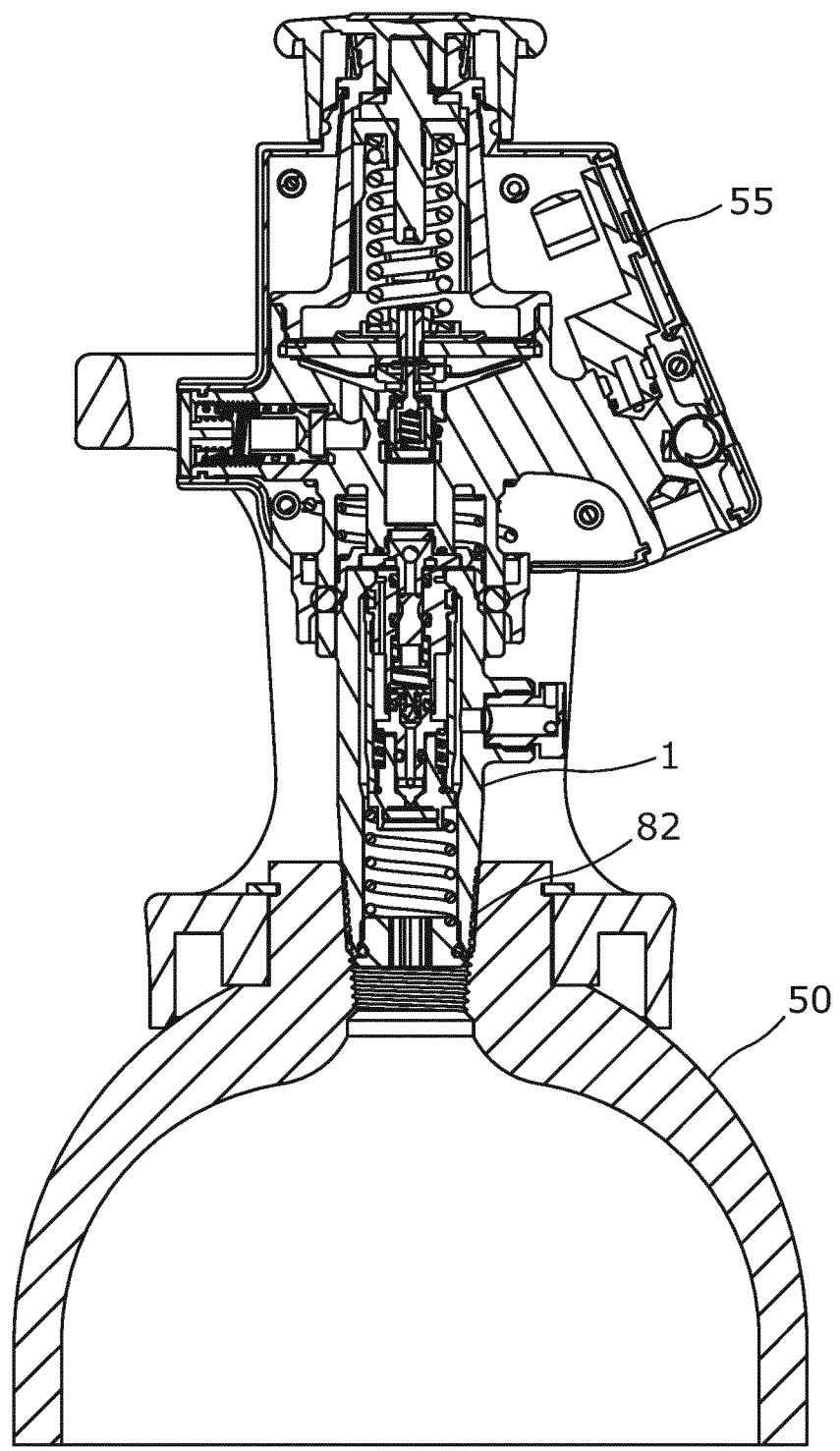

FIG. 27 shows, in a cross-sectional view, the gas pressure regulation device 55 connected with the valve assembly 1 being arranged in the cylinder opening 82 of the gas cylinder 50.

Figure 28:
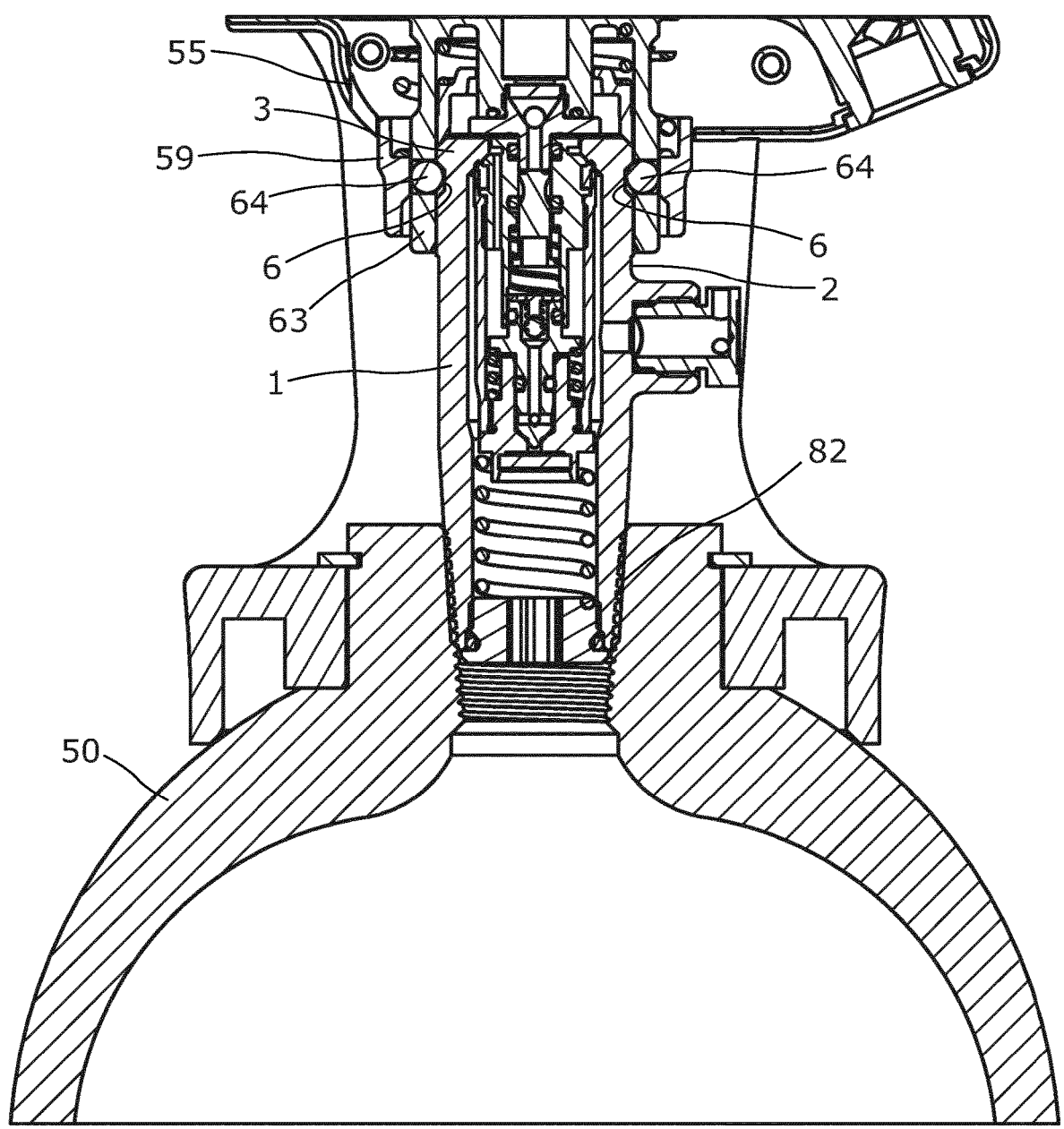

FIG. 28 shows an enlarged cross-sectional view of the connection between the valve assembly 1 and the gas cylinder, and the connection between the valve assembly and the gas pressure regulation device 55. As previously described, the valve assembly 1 has a threaded area on the outer face of the valve housing 2 which is configured to be screwed into a corresponding thread in the cylinder opening 82 of the gas cylinder. As described above, the gas pressure regulation device 55 is configured to be connected with the valve assembly 1, and the collar 63 is configured to engage the first housing end 3 of the valve assembly 1. In a groove in the collar 63, balls 64 are arranged. The balls 64 are configured to be displaced radially inwards when the connection handle 59 is pressed downwards, so that the balls may engage the groove 6 of the valve assembly 1, whereby a mechanical locking between the valve assembly 1 and the gas pressure regulation device 55 is obtained.

Figure 29:
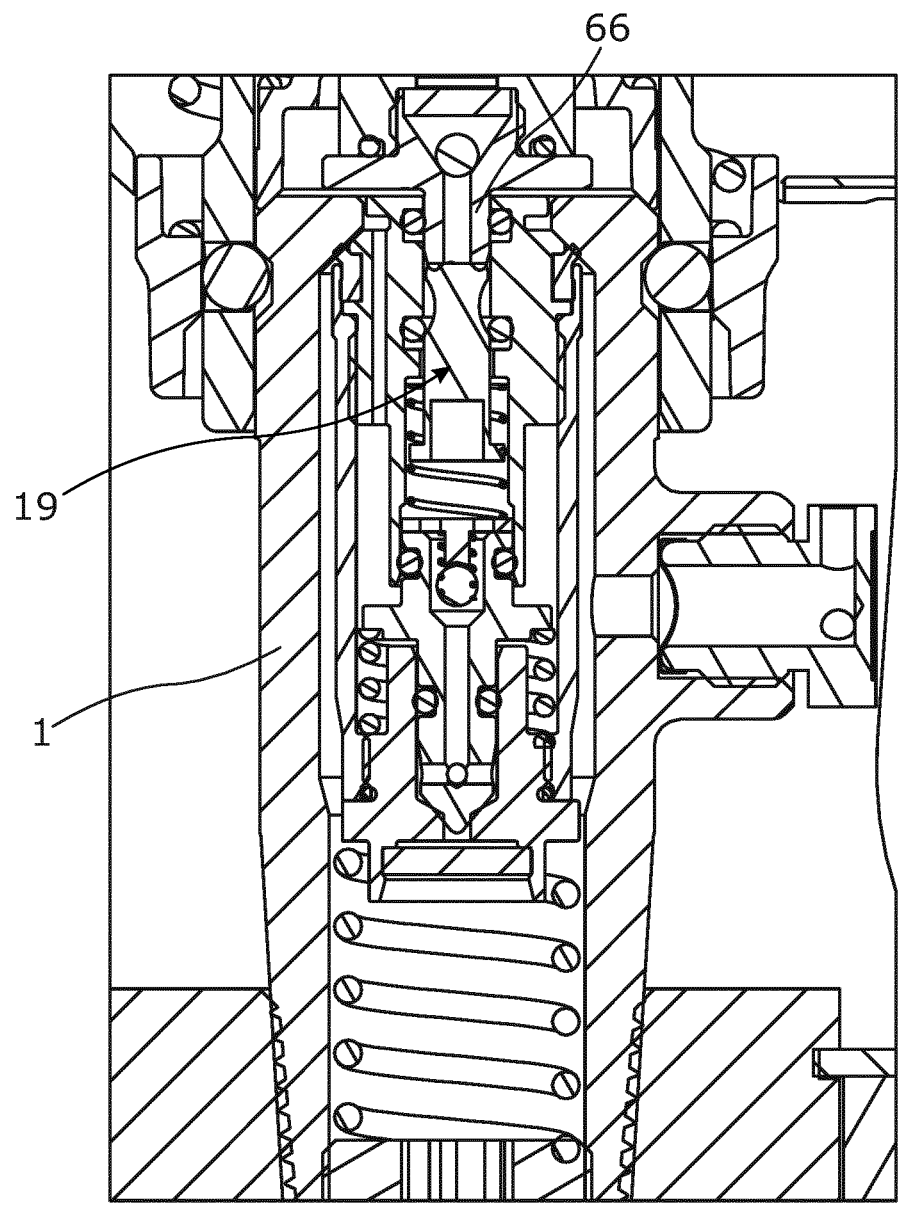

FIG. 29 is a cross-sectional view showing the external pressure body 66 being displaced downwards to open the consumption valve 19 of the valve assembly 1.

FIGS. 30a-30f show an adaptor unit 90 configured to be connected with the first housing end of the valve housing of the valve assembly (not shown) and in the opposite end with a gas pressure regulation device. By connecting the adaptor unit 90 to the valve assembly it is obtained that the gas pressure regulation device may be positioned at a distance from the gas cylinder.

Figure 30A:
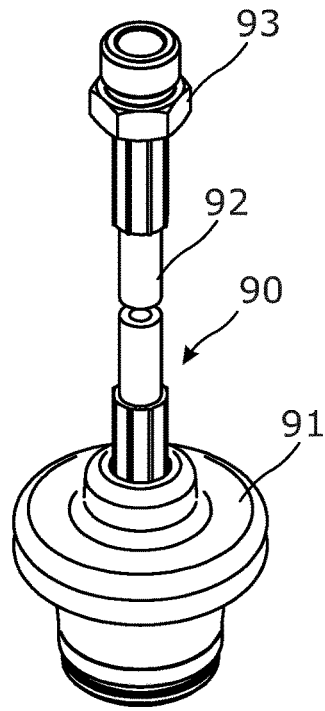
Figure 30B:
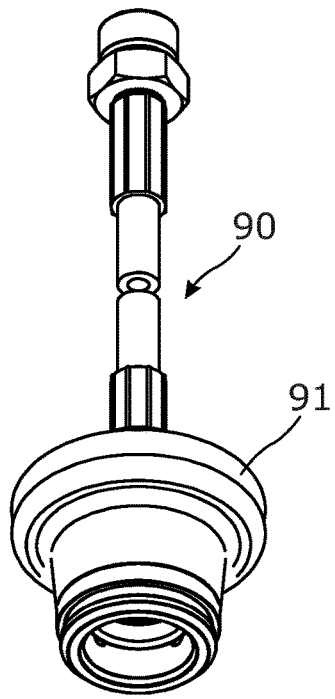
Figure 30C:
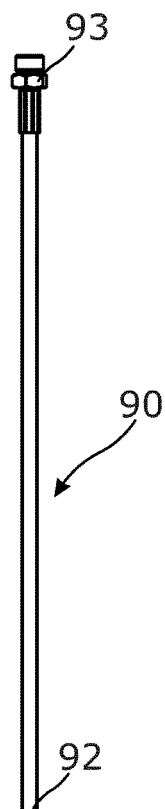
Figure 30D:
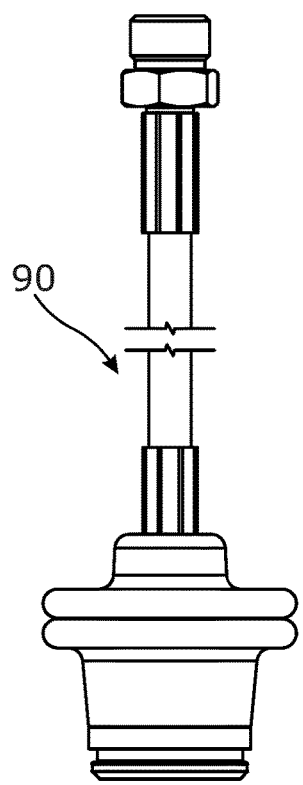
Figure 30E:
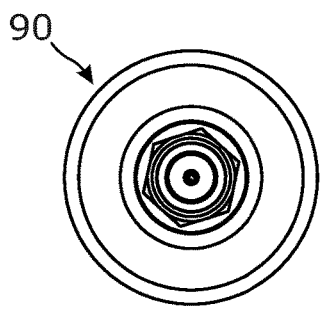
Figure 30F:
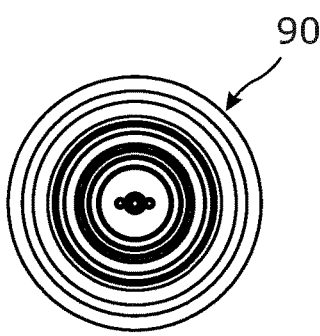

In FIG. 30a, the adaptor unit 90 is shown. The adaptor unit 90 comprises a first connector 91 configured to connect with the first housing end of the valve assembly and a hose part 92 which ends in a second connector 93. In FIG. 30b, the first connector 91 is shown seen partly from below. FIGS. 30c-30d show the adaptor unit in a side view and FIG. 30e shows the adaptor unit from above, and FIG. 30f shows the adaptor unit from below.

Figure 30G:
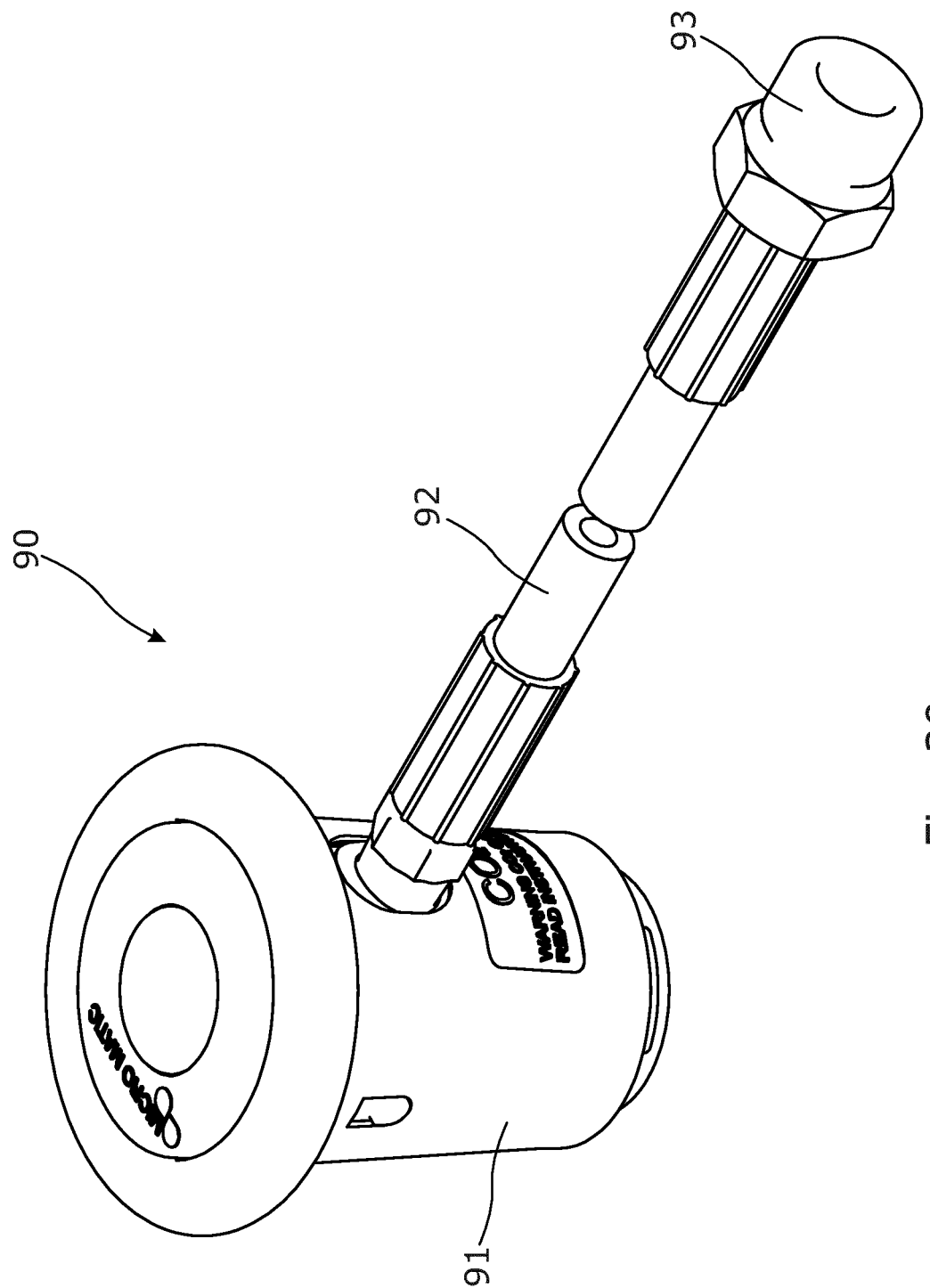

FIGS. 30g-30i show another adaptor unit 90. The adaptor unit 90 also comprises a first connector 91 configured to connect with the first housing end of the valve assembly and a hose part 92 which ends in a second connector 93. In FIG. 30g, the adaptor unit 90 is shown in a perspective view. The hose part 92 is connected with the first connector 91 radially meaning that the first connector 91 has a radial outlet in view of the valve assembly. The hose part 92 is connected with an outlet. FIG. 30h shows the adaptor unit 90 seen in a top view. FIG. 30i shows a cross-sectional view of the adaptor unit 90 taken along the A-A line of FIG. 30h. In the same manner as the gas pressure regulation device described above, the first connector 91 of the adaptor unit 90 is configured to be connected with the valve assembly. The first connector 91 comprises a connector collar configured to engage the first housing end of the valve assembly. In a groove in the connector collar, connector balls 95 are arranged. The connector balls 95 are configured to be displaced radially inwards when a connection part is pressed downwards, whereby a mechanical locking between the valve assembly and adaptor unit 90 is obtained. The first connector 91 also comprises an external pressure body 66 configured to be displaced downwards to open the consumption valve of the valve assembly.

Figure 31A:
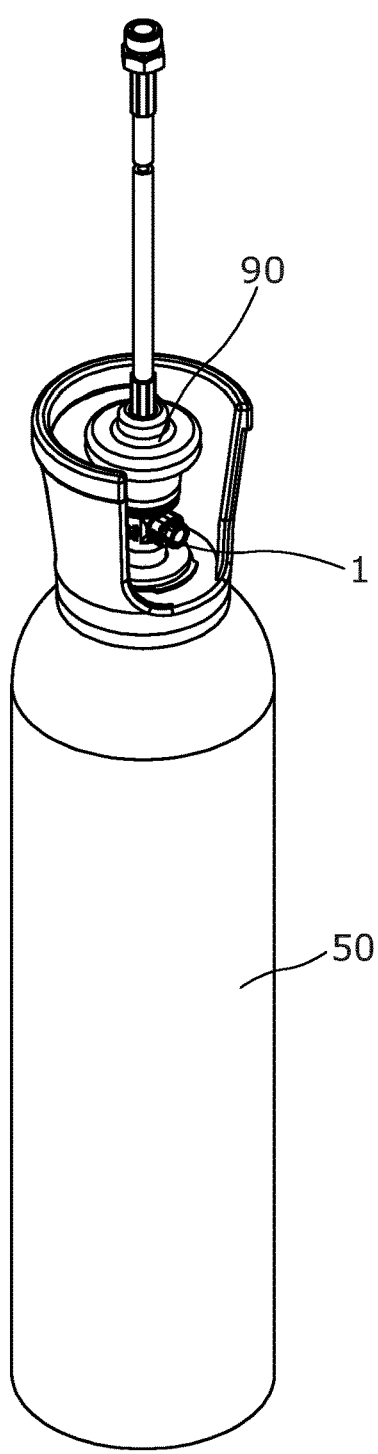
Figure 31B:
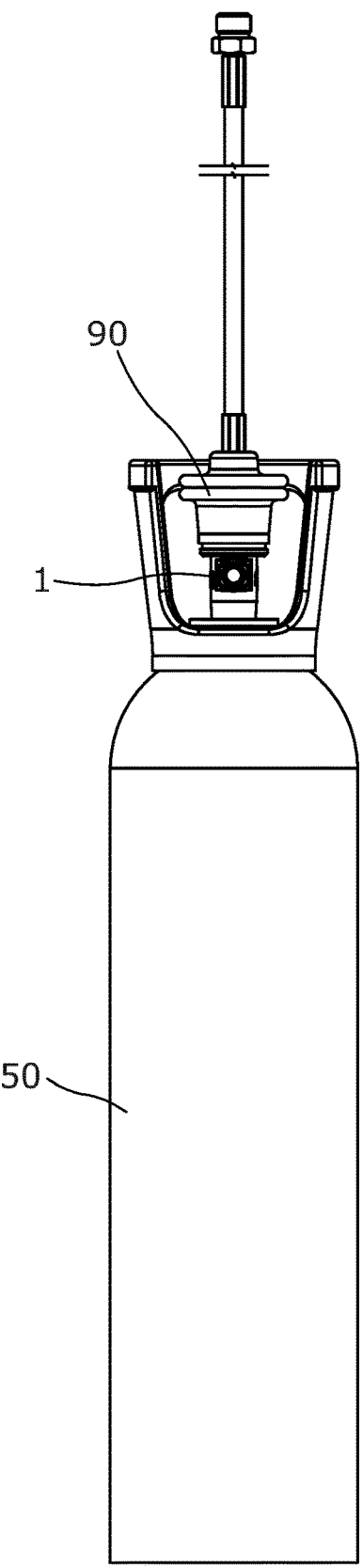

FIGS. 31a-31b show the adaptor unit 90 connected with the valve assembly 1 being arranged in the gas cylinder 50.

FIG. 32 shows, in a cross-sectional view, the adaptor unit 90 connected with valve assembly 1 being arranged in the gas cylinder 50. FIG. 33 shows an enlarged cross-sectional view of the adaptor unit 90. In same manner as the gas pressure regulation device described above, the first connector 91 of the adaptor unit 90 is configured to be connected with the valve assembly. The first connector 91 comprises a connector collar 94 configured to engage the first housing end of the valve assembly. In a groove in the collar 94, connector balls 95 are arranged. The balls 95 are configured to be displaced radially inwards when a connection part 96 is pressed downwards, so that the balls may engage the groove of the valve assembly as seen in FIG. 19, whereby a mechanical locking between the valve assembly and adaptor unit 90 is obtained. Furthermore, the first connector 91 also comprises a spring-loaded inner connector ring 97, which is configured to maintain the connector balls 95 within the grooves in a not-engaging position, in the deactivated position. The first connector 91 also comprises an external pressure body 66 configured to be displaced downwards to open the consumption valve of the valve assembly.

Figure 34A:
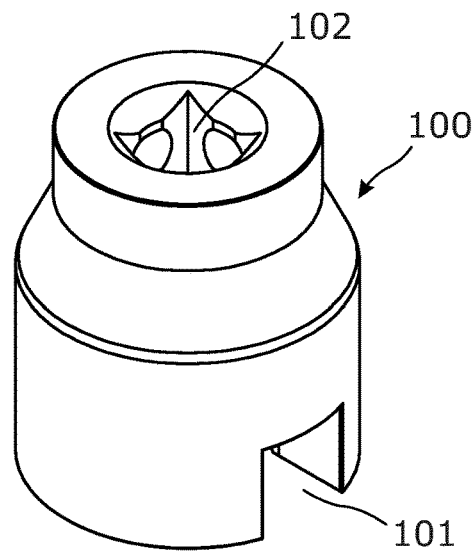
Figure 34B:
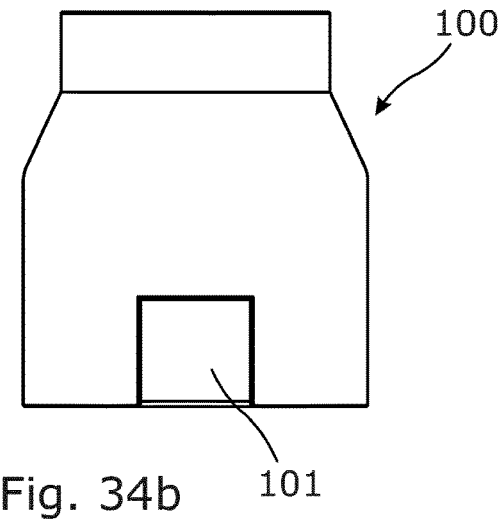
Figure 34C:
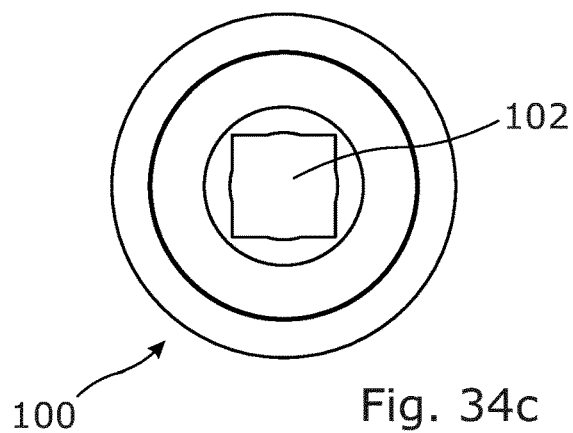

In FIGS. 34a-34c, a tool 100 configured to connect and disconnect a valve assembly from the cylinder opening of a gas cylinder is shown. The tool 100 has a recess 101 in which the pressure relief valve may be fitted so that a mechanical locking of the tool 100 and the valve assembly is obtained. A winch or similar tool may be inserted in a hollow 102 at the top of the tool 100, facilitating the rotation of the valve assembly when it is mounted or dismounted from the gas cylinder.

Figure 35A:
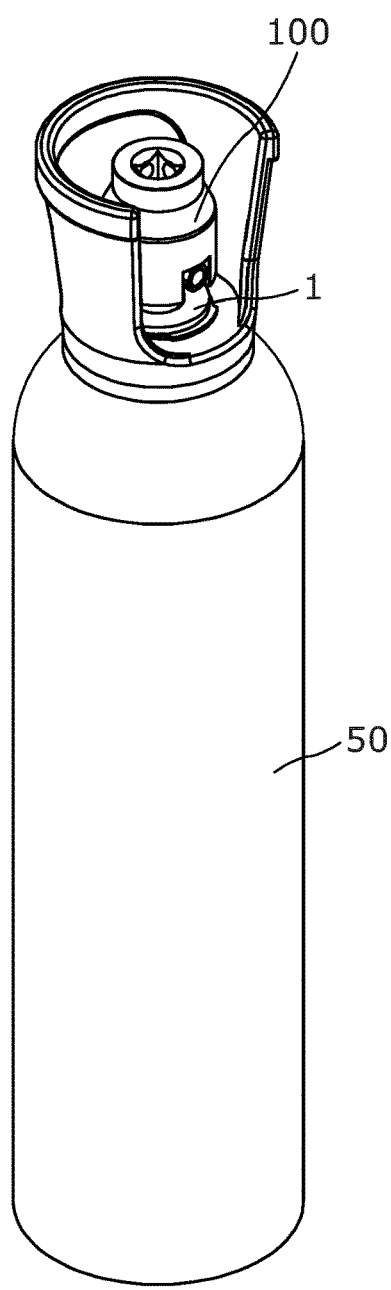
Figure 35B:
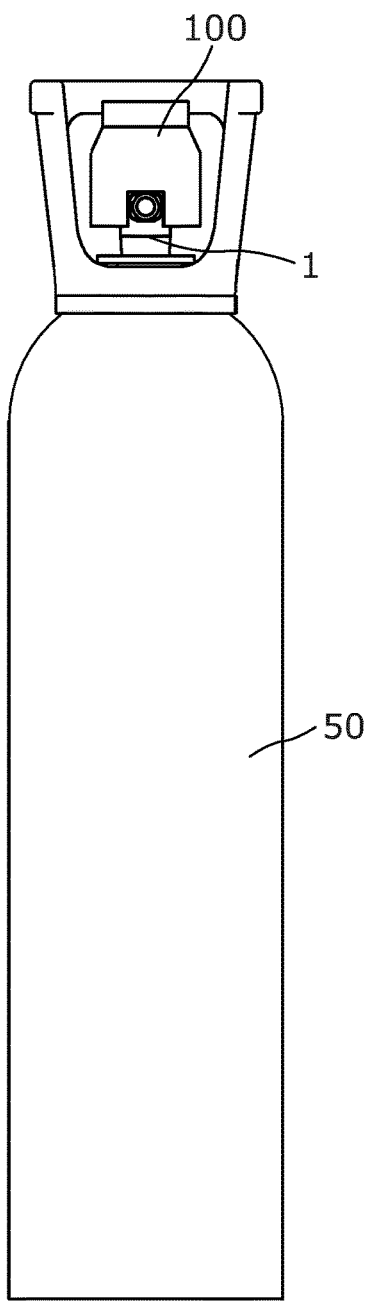
Figure 35C:
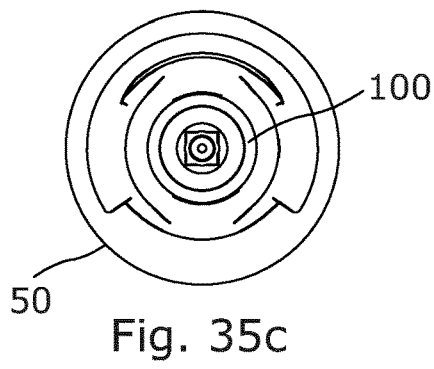

In FIGS. 35a-35c, the tool 100 is arranged in connection with the valve assembly 1 which again is to be mounted or dismounted from the gas cylinder 50.

FIGS. 36a-36c show a gas filling device 120 configured to be connected with the valve assembly and to open the gas filling valve of the valve assembly to a filling position.

Figure 37A:
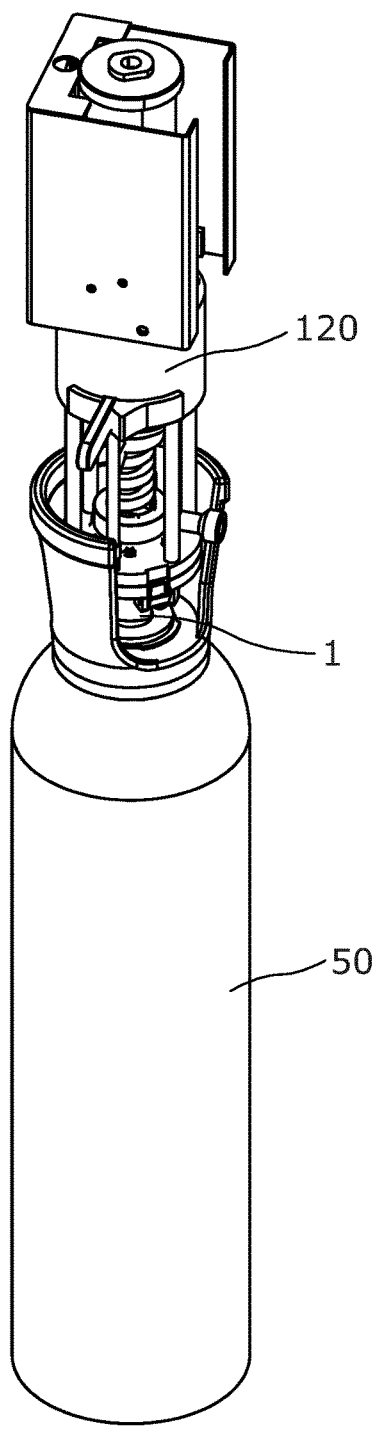
Figure 37B:
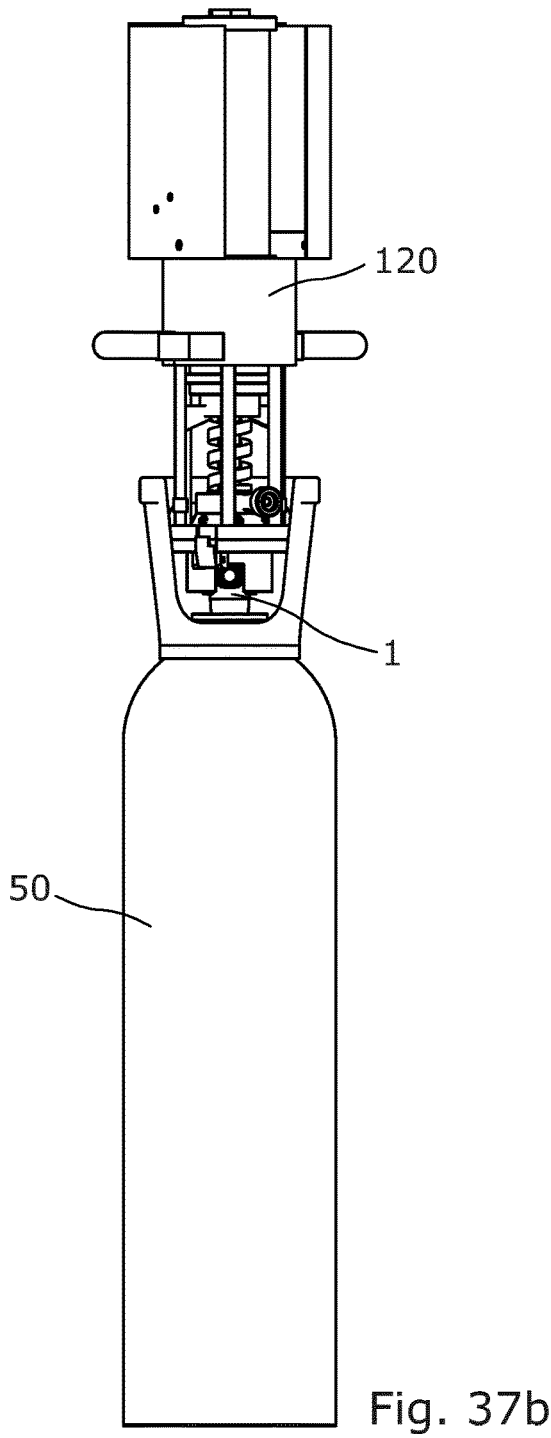
Figure 37C:
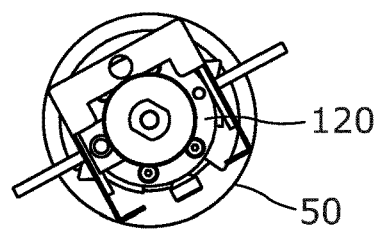

FIGS. 37a-37c show the gas filling device 120 connected with the valve assembly 1 arranged in the gas cylinder 50.

Figure 37D:
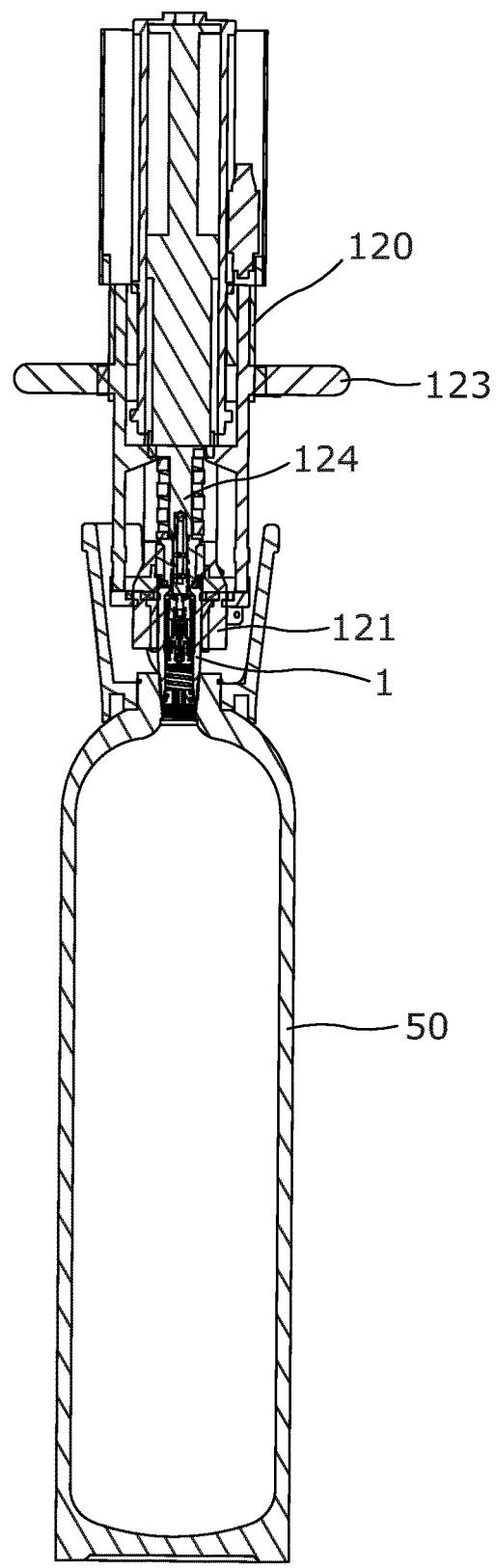
Figure 37E:
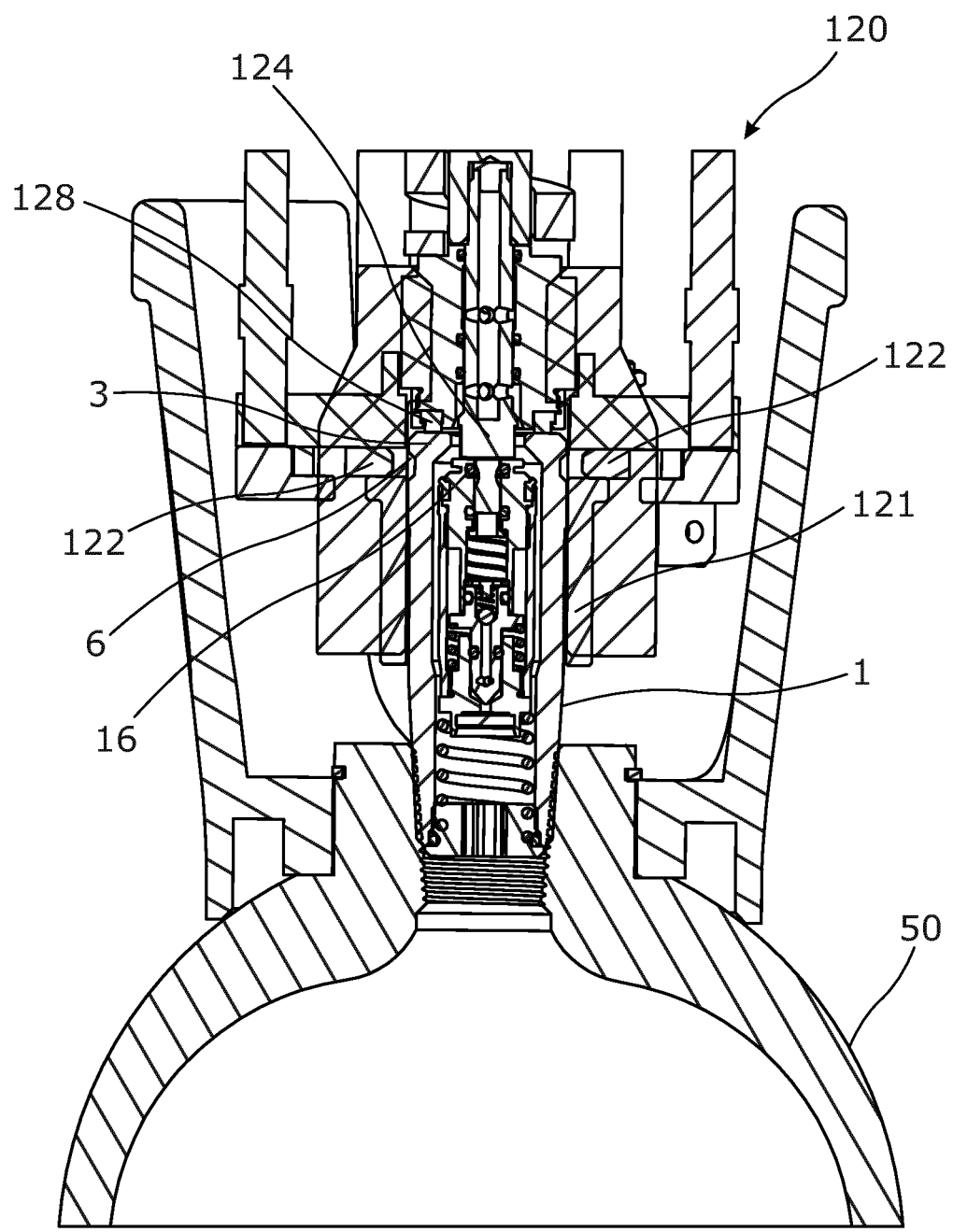

FIG. 37d shows the gas filling device 120 connected with the valve assembly 1 arranged in the gas cylinder 50 in a cross-sectional view. In FIG. 37e, an enlarged view of the connection between the gas filling device 120 and valve assembly is shown in a cross-sectional view. The gas filling device 120 comprises a collar 121 substantially having the same design as the collar of the gas pressure regulation device as described above, and the collar 121 is, in the same manner, configured to engage the first end of the valve assembly 1. In the present embodiment, the collar 121 has jaws 122 configured to be displaced radially inwards by means of the connection handle 123 when it is displaced downwards, so that the jaws 122 are projecting and engaging the groove 6 of the valve assembly.

The gas filling device 120 also comprises a plunger 124. When the plunger 124 is activated and displaced downwards, the gas filling valve 16 of the valve assembly 1 is displaced downwards and opened accordingly. Hereby it is possible to refill the gas cylinder with gas in the most expedient manner.

The gas filling device 120 comprises a gasket 128. The gasket 128 is configured to seal on a top face at the first end 3 of the valve assembly 1, so that when the gas filling device 120 is connected with the valve assembly 1, a seal is provided so that leak of gas between the gas filling device 120 and the surroundings is avoided during the filling process.

In another not shown embodiment, the gas filling device 120 is configured to be positioned above in relation to the valve assembly 1 arranged in the gas cylinder 50 and brought into sealing engagement of the gasket 128 and the top face of the valve assembly by applying a pressure on the gas filling device 120 towards the valve assembly 1 or by applying a pressure on the gas cylinder 50, so that the valve assembly is pressed against the gas filling device 120 in the correct position.

When the sealing is obtained between the gas filling device and the valve assembly, the plunger may activate the gas filling valve of the valve assembly so that the gas cylinder may be refilled. In addition, the gas filling device and the gas filling valve of the valve assembly may also be used to apply a vacuum to the gas cylinder, for instance for removing contaminated gas inside the gas cylinder.

The gas consuming system may be a beverage dispensing system, a welding system, a medical dispensing system, or a similar system utilising gas at a predetermined gas pressure.

Figure 39:
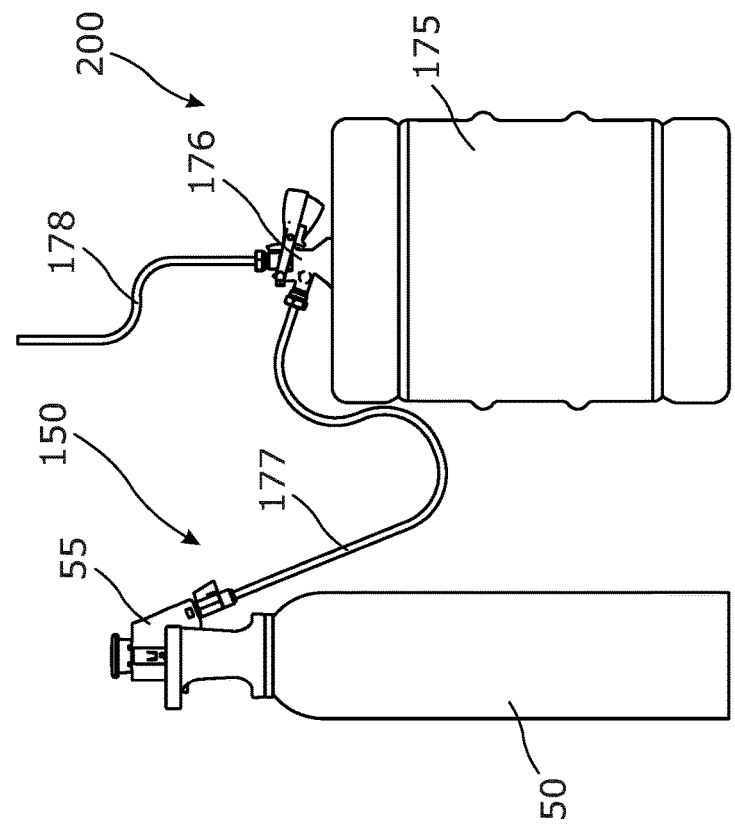
Figure 38:
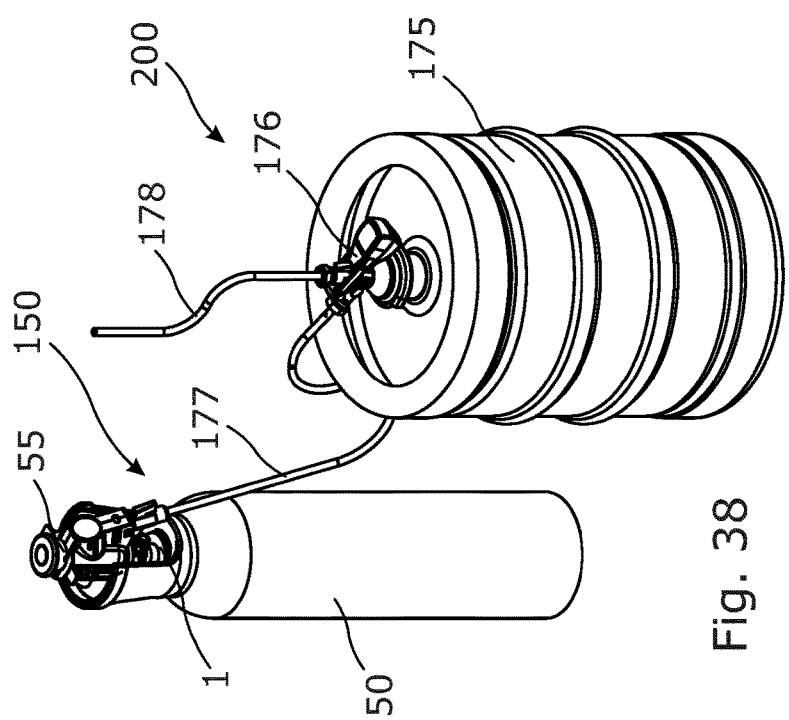
Figure 40:
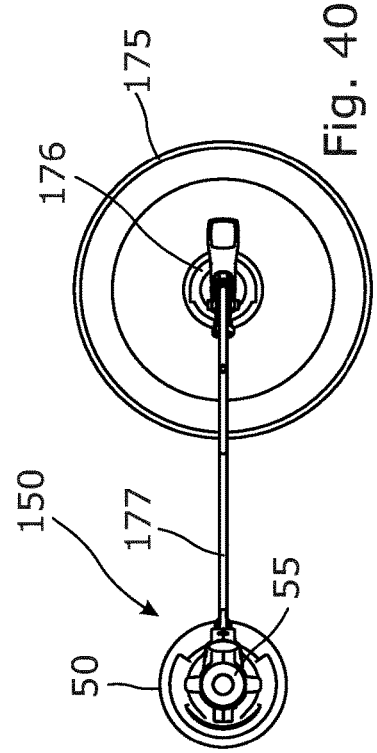

In FIGS. 38-40, an embodiment of a beverage dispensing system 200 for dispensing beverages is shown. The beverage dispensing system 200 comprises a gas delivering system 150 as described above. The gas delivery system 150 comprises a gas cylinder 50 having the valve assembly 1 and a gas pressure regulation device 55. The gas delivery system 150 is configured to deliver a predetermined gas pressure to a beverage container 175 having an extractor tube (not shown). A dispense head 176 is coupled to the extractor tube and is configured to lead a gas, such $CO_2$, from gas supply line 177 into the beverage container wherein the gas is used to expel the beverage from the beverage container 175 into the dispensing line 178.

Figure 42:
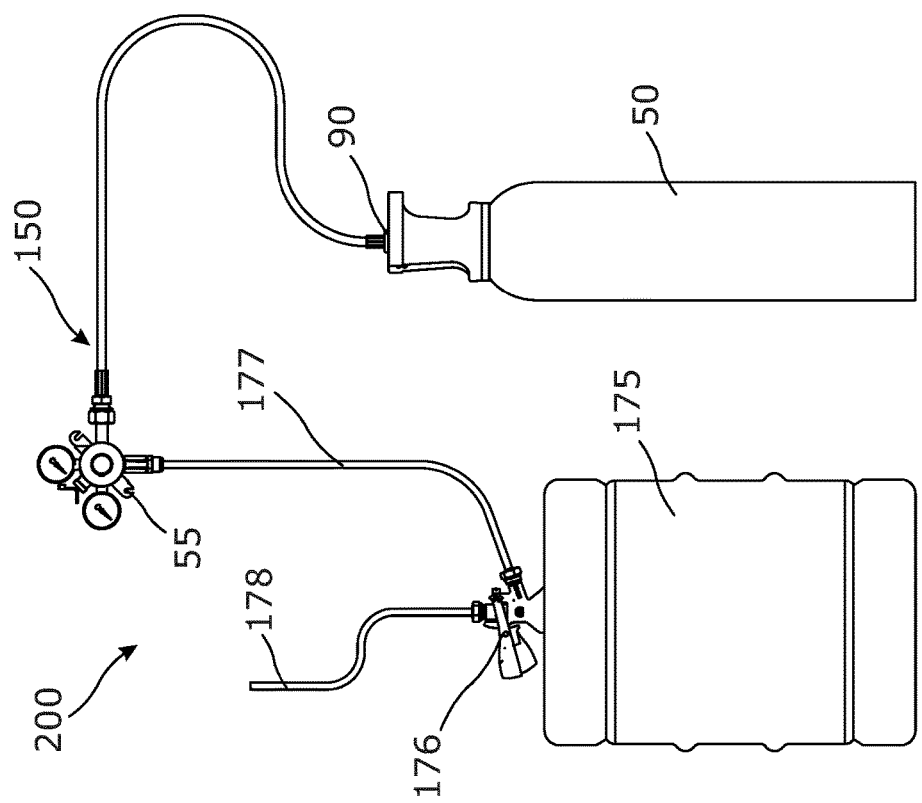
Figure 41:
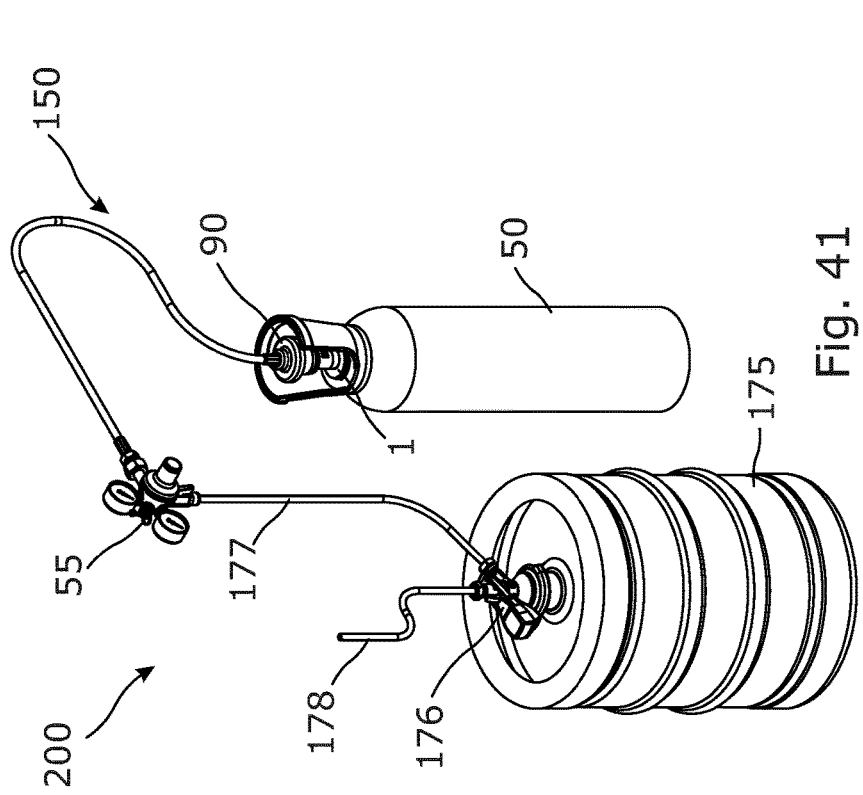
Figure 43:
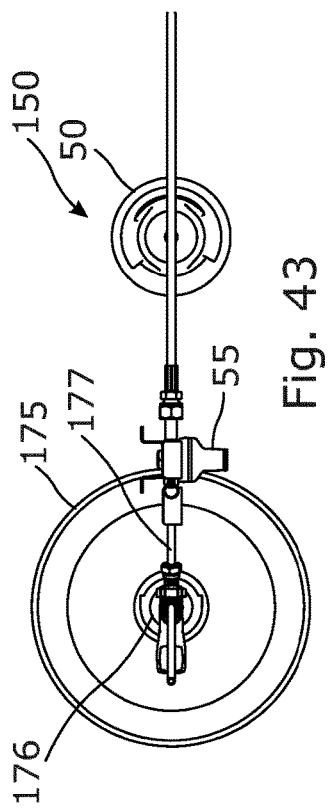

In FIGS. 41-43, another embodiment of a beverage dispensing system 200 for dispensing beverages is shown. The beverage dispensing system 200 comprises a gas delivering system 150 as described above. The gas delivery system 150 comprises, in this embodiment, a gas cylinder 50 having the valve assembly 1 and an adaptor unit 90. The adaptor unit 90 connects the gas cylinder 50 with a gas pressure regulation device 55 arranged a distance from the gas cylinder 50. The gas delivery system 150 is configured to deliver a predetermined gas pressure to a beverage container 175 having an extractor tube (not shown). A dispense head 176 is coupled to the extractor tube and is configured to lead a gas, such $CO_2$, from gas supply line 177 into the beverage container wherein the gas is used to expel the beverage from the beverage container 175 into the dispensing line 178.

The first gas pressure is the pressure in the gas cylinder, and the second gas pressure is the same gas pressure reduced to a predetermined level, which could be an intermediate pressure, which facilitates handling of the gas cylinders. The first reduction valve of the valve assembly is arranged in the cylinder opening of the gas cylinder.

The first gas pressure may for instance be as high as 250 bar. The second pressure may be anything between 1 to 80 bar, however, often around 35 bar.

Although the invention has been described in the above in connection with preferred embodiments of the invention, it will be evident for a person skilled in the art that several modifications are conceivable without departing from the invention as defined by the following claims.

The invention claimed is:

1. A valve assembly configured to be arranged in a cylinder opening of a gas cylinder, comprising:
   a valve housing having
      a first housing end and a second housing end,
      a first housing opening arranged at the first housing end and a second housing opening arranged at the second housing end, the first housing opening having an inner diameter, and
      a bore extending between the first housing opening and the second housing opening, the bore having an inner face, and
   an inner valve unit arranged in the bore, said inner valve unit having
      an inner valve housing, and
      a first end and a second end,
      the first end having an outer diameter, the outer diameter being larger than the inner diameter of the first housing opening, the first end being configured to abut the inner face at the first opening, whereby a filling valve is provided, the inner face of the first opening being a filling valve seat,
      the second end comprising an inlet to the inner valve unit,
      the inner valve unit further comprising:
      a consumption valve arranged at the first end, and
      a first pressure reduction valve configured to reduce a pressure in the gas cylinder from a first gas pressure to a second gas pressure,
   wherein the valve assembly further comprises a protection device arranged in connection with and configured to interact with the inner valve unit to hinder unintended gas flow into the gas cylinder, and
   wherein the protection device comprises a residue pressure valve and a non-return valve, the residue pressure valve being configured to ensure that the gas cylinder will maintain a predetermined overpressure so that a flow of gas is hindered into the gas cylinder, and the non-return valve is configured to ensure that the gas cylinder cannot unintendedly be filled through the consumption valve,
   wherein the residue pressure valve comprises a first closing part being configured to abut a residue pressure valve seat,
   wherein the first closing part comprises a first part end and a second part end, the first part end being closest to the inner valve unit and the second part end comprising a radially extending abutment flange having an outer flange diameter, the radially extending abutment flange being configured to abut the residue pressure valve seat, the residue pressure valve seat being an inner bore of the valve assembly and having an inner bore diameter, the inner bore diameter being substantially equal to the outer flange diameter.

2. A valve assembly according to claim 1, wherein the inner bore comprises a circumferential groove wherein a sealing element is arranged.

3. A valve assembly according to claim 1, wherein a bottom piece is arranged in the inlet, the bottom piece comprises one or more piece opening(s) fluidly connecting the inner valve unit with the bore.

4. A valve assembly according to claim 3, wherein the bottom piece comprises a piece bore, the first part end of the first closing part being arranged movably in the piece bore, and the first part end comprising a pin being larger than the piece bore ensuring that the first closing part is maintained in relation to the bottom piece.

5. A valve assembly according to claim 1, wherein the residue pressure valve has a first spring exerting a first predetermined spring force on the first closing part, so that the first closing part is configured to abut the residue pressure valve seat when the pressure inside the gas cylinder is lower than the first predetermined spring force.

6. A valve assembly according to claim 5, wherein the first spring is extending between the bottom piece and the abutment flange.

7. A valve assembly according to claim 1, wherein the first pressure reduction valve comprises a second closing part configured to abut a pressure reduction valve seat, the second closing part having a second abutment face, the second abutment face being made of a semi-rigid or rigid material.

8. A valve assembly according to claim 7, wherein the inner valve unit has an outer unit diameter and the second closing part has an outer closing diameter in the opposite end of the end abutting the pressure reduction valve seat, the outer unit diameter and the outer closing diameter interact together with the abutment flange as the non-return valve.

9. A valve assembly according to claim 1, wherein the valve housing has an outer face at the first housing end, the outer face comprising first connection means configured to receive corresponding second connection means of a pressure regulator or an adaptor unit.

10. A valve assembly according to claim 1, wherein a filter element is arranged upstream of the first reduction valve.

11. A valve assembly according to claim 1, wherein a venting channel is arranged in the inner valve unit, the venting channel being configured to vent the inside of the inner valve unit.

12. A combination including the gas cylinder and the valve assembly according to claim 1 the cylinder containing a gas under pressure, wherein the valve assembly is arranged in the cylinder opening.

13. A gas delivering system for delivering a gas pressure to a gas consuming system, comprising:
a gas cylinder having the valve assembly according to claim 1, and
a gas pressure regulation device being connected with the first housing end of the valve housing.

14. A gas delivering system according to claim 13, wherein an adaptor unit or the gas pressure regulation device comprises corresponding second connection means so that connection of the adaptor unit and/or the gas pressure regulation device to the valve assembly is facilitated.

15. A gas delivering system according to claim 13, wherein the gas delivering system comprises a tamper evident strip, the tamper evident strip being configured to be inserted into holes in the gas pressure regulation device.

16. A gas consuming system comprising a gas delivering system according to claim 13.

17. A beverage dispensing system for dispensing beverages, comprising a gas delivering system according to claim 13.

18. A valve assembly configured to be arranged in a cylinder opening of a gas cylinder, comprising:
a valve housing having
a first housing end and a second housing end,
a first housing opening arranged at the first housing end and a second housing opening arranged at the second housing end, the first housing opening having an inner diameter, and
a bore extending between the first housing opening and the second housing opening, the bore having an inner face, and
an inner valve unit arranged in the bore, said inner valve unit having
an inner valve housing, and
a first end and a second end,
the first end having an outer diameter, the outer diameter being larger than the inner diameter of the first housing opening, the first end being configured to abut the inner face at the first opening, whereby a filling valve is provided, the inner face of the first opening being a filling valve seat,
the second end comprising an inlet to the inner valve unit,
the inner valve unit further comprising:
a consumption valve arranged at the first end, and
a first pressure reduction valve configured to reduce a pressure in the gas cylinder from a first gas pressure to a second gas pressure,
wherein the valve assembly further comprises a protection device arranged in connection with and configured to interact with the inner valve unit to hinder unintended gas flow into the gas cylinder, and
wherein the protection device comprises a residue pressure valve and a non-return valve, the residue pressure valve being configured to ensure that the gas cylinder will maintain a predetermined overpressure so that a flow of gas is hindered into the gas cylinder, and the non-return valve is configured to ensure that the gas cylinder cannot unintendedly be filled through the consumption valve,
wherein the residue pressure valve comprises a first closing part being configured to abut a residue pressure valve seat,
wherein a bottom piece is arranged in the inlet, the bottom piece comprises one or more piece opening(s) fluidly connecting the inner valve unit with the bore, and
wherein the bottom piece comprises a piece bore, the first part end of the first closing part being arranged movably in the piece bore, and the first part end comprising a pin being larger than the piece bore ensuring that the first closing part is maintained in relation to the bottom piece.

19. A valve assembly according to claim 18, wherein the first closing part comprises a first part end and a second part end, the first part end being closest to the inner valve unit and the second part end comprising a radially extending abutment flange having an outer flange diameter, the radially extending abutment flange being configured to abut the residue pressure valve seat, the residue pressure valve seat being an inner bore of the valve assembly and having an inner bore diameter, the inner bore diameter being substantially equal to the outer flange diameter.

20. A valve assembly according to claim 18, wherein the inner bore comprises a circumferential groove wherein a sealing element is arranged.

21. A valve assembly according to claim 18, wherein the residue pressure valve has a first spring exerting a first predetermined spring force on the first closing part, so that the first closing part is configured to abut the residue pressure valve seat when the pressure inside the gas cylinder is lower than the first predetermined spring force.

22. A valve assembly according to claim 21, wherein the first spring is extending between the bottom piece and the abutment flange.

23. A valve assembly according to claim 18, wherein the first pressure reduction valve comprises a second closing part configured to abut a pressure reduction valve seat, the second closing part having a second abutment face, the second abutment face being made of a semi-rigid or rigid material.

24. A valve assembly according to claim 23, wherein the inner valve unit has an outer unit diameter and the second closing part has an outer closing diameter in the opposite end of the end abutting the pressure reduction valve seat, the outer unit diameter and the outer closing diameter interact together with the abutment flange as the non-return valve.

25. A valve assembly according to claim 18, wherein the valve housing has an outer face at the first housing end, the outer face comprising first connection means configured to receive corresponding second connection means of a pressure regulator or an adaptor unit.

26. A valve assembly according to claim 18, wherein a filter element is arranged upstream of the first reduction valve.

27. A valve assembly according to claim 18, wherein a venting channel is arranged in the inner valve unit, the venting channel being configured to vent the inside of the inner valve unit.

28. A combination including the gas cylinder and the valve assembly according to claim 18 the cylinder containing a gas under pressure, wherein the valve assembly is arranged in the cylinder opening.

29. A gas delivering system for delivering a gas pressure to a gas consuming system, comprising:
   a gas cylinder having the valve assembly according to claim 18, and
   a gas pressure regulation device being connected with the first housing end of the valve housing.

30. A gas delivering system according to claim 29, wherein an adaptor unit or the gas pressure regulation device comprises corresponding second connection means so that connection of the adaptor unit and/or the gas pressure regulation device to the valve assembly is facilitated.

31. A gas delivering system according to claim 29, wherein the gas delivering system comprises a tamper evident strip, the tamper evident strip being configured to be inserted into holes in the gas pressure regulation device.

32. A gas consuming system comprising a gas delivering system according to claim 29.

33. A beverage dispensing system for dispensing beverages, comprising a gas delivering system according to claim 29.

* * * * *